United States Patent
Blumbergs et al.

(10) Patent No.: US 6,898,513 B2
(45) Date of Patent: May 24, 2005

(54) NAVIGATION METHOD AND SYSTEM FOR DYNAMIC ACCESS TO DIFFERENT DEGREES OF NAVIGATION FUNCTION

(75) Inventors: Eric Blumbergs, Beverly Hills, MI (US); Tatsuo Yokota, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 10/390,448

(22) Filed: Mar. 15, 2003

(65) Prior Publication Data

US 2004/0181334 A1 Sep. 16, 2004

(51) Int. Cl.⁷ .............................................. G01C 21/00
(52) U.S. Cl. ...................................... 701/200; 701/301
(58) Field of Search ................................ 701/200, 211, 701/215, 96, 301; 340/435, 436, 903, 905

(56) References Cited

U.S. PATENT DOCUMENTS

| | | |
|---|---|---|
| 5,757,359 A | 5/1998 | Morimoto et al. |
| 5,764,139 A | 6/1998 | Nojima et al. |
| 5,983,161 A * | 11/1999 | Lemelson et al. .......... 701/301 |
| 6,289,278 B1 | 9/2001 | Endo et al. |

* cited by examiner

*Primary Examiner*—Yonel Beaulieu
(74) *Attorney, Agent, or Firm*—Muramatsu & Associates

(57) ABSTRACT

A navigation method and system allows dynamic access to different degrees of navigation functions while a vehicle is in motion based on the surrounding vehicles or obstacles as detected by sensors provided on the vehicle. The navigation method includes the steps of detecting whether the user vehicle is in motion or stationary, detecting other vehicles or obstacles surrounding the user vehicle by a sensor and measuring distances therefrom when the vehicle is in motion, evaluating resultant data from the sensor and determining a range of driving conditions, and changing a degree of accessibility to navigation functions based on the range of the driving conditions and displaying entries on a monitor of the navigation system where the maximum number of the entries that can be selected by a user is limited by the degree of accessibility.

22 Claims, 19 Drawing Sheets

<Enter>    <Cancel>

Fig. 12A
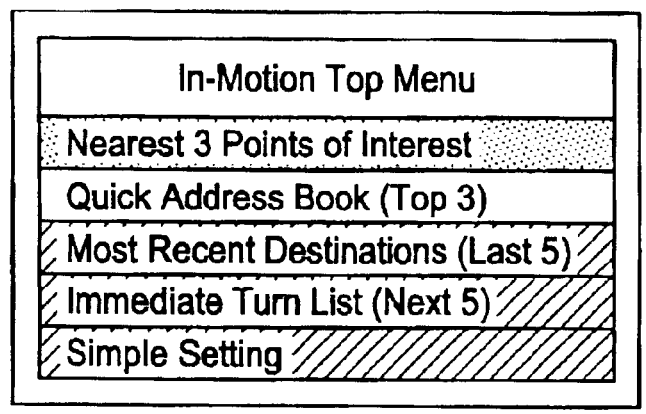
Fig. 12B
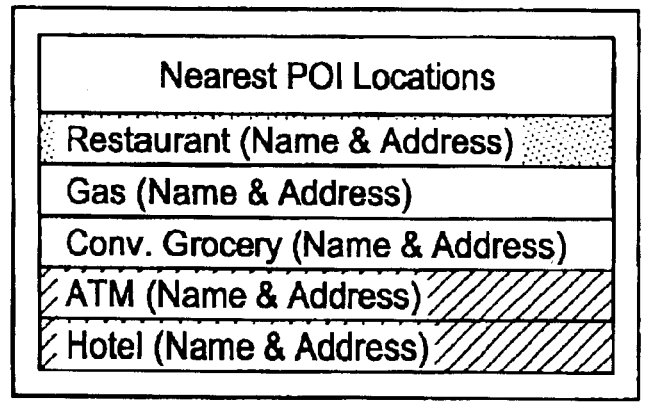
Fig. 12C
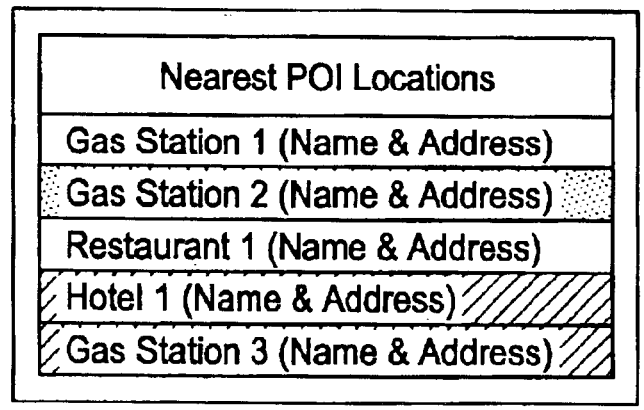

<Enter>  <Cancel>

<Enter> <Cancel>

<Enter> <Cancel>

Fig. 20A
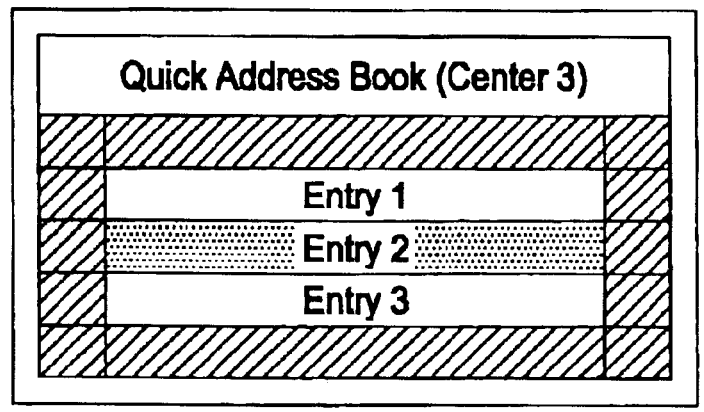
Fig. 20B
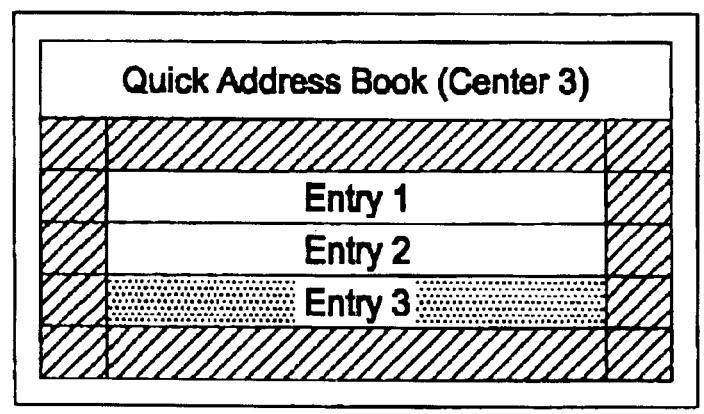
Fig. 20C
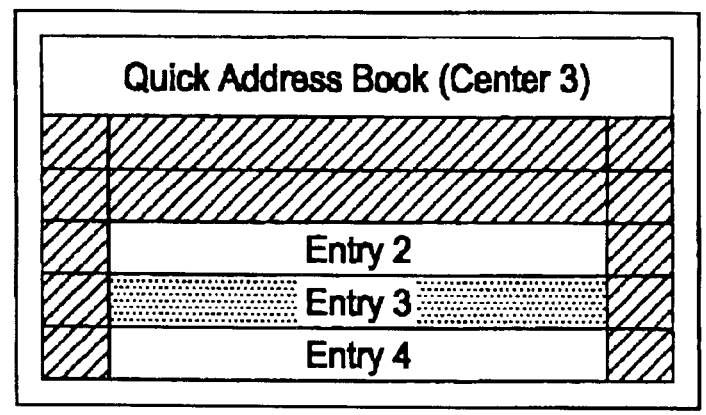

NAVIGATION METHOD AND SYSTEM FOR DYNAMIC ACCESS TO DIFFERENT DEGREES OF NAVIGATION FUNCTION

FIELD OF THE INVENTION

This invention relates to a navigation method and system for dynamic access to navigation functions, and more particularly, to a navigation method and system for allowing dynamic access to different degrees of navigation functions when a vehicle is in motion based on the surrounding circumstances such as vehicles and obstacles detected by sensors provided on the vehicle.

BACKGROUND OF THE INVENTION

A vehicle navigation system performs vehicle travel guidance for enabling a driver to easily drive the vehicle to a selected destination. Such a navigation system detects the position of the vehicle, reads out map data pertaining to an area at the vehicle current position from a data storage medium, for example, a CD-ROM (compact disk read-only memory), a DVD (digital versatile disc) or from a remote navigation server, and displays a map image on a monitor (display) screen while superimposing a mark representing the current location of the vehicle on a predetermined portion of the map image.

As the present position of the vehicle changes with the travel of the vehicle, the vehicle current position mark on the map image changes accordingly. Thus, navigation system enables the user to recognize the area at the vehicle position at a glance. When a destination is not set, such a navigation system functions as a locator map which indicates the current location of the vehicle on the map image. When the destination is set, the navigation system starts a route guidance function through a guided route from the starting point to the destination.

Typically, the route guidance function performs an intersection guidance process in which a monitor screen displays an enlarged intersection diagram and the direction in which the vehicle is to travel while displaying the guide route on a map. When a destination is input, a CPU in the navigation system automatically determines a most suitable guided route (calculated route) and successively stores nodes data (expressed in longitude and latitude) of the calculated route in a memory.

During actual traveling, the node data series stored in the memory is searched for a portion of the guided route to be displayed in a map display area of the monitor screen, and the portion of the guided route is highlighted so as to be discriminable from other routes. When the vehicle is within a predetermined distance from an intersection it is approaching, an enlarged or highlighted intersection diagram with an arrow indicating the direction in which the vehicle is to turn at the intersection is displayed to inform the user the direction of turn at the intersection.

FIG. 1A shows an example of the locator map display containing a vehicle current position mark VP on a map image 21. Typically, a navigation system shows the street on which the vehicle is running in the map image 21 and a name of the street in a message box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

FIG. 1B shows an example of the route guidance display for guiding the user to the destination. The route guidance display is activated after specifying the destination. In this example, the current street "W 190TH ST" and the left side of the street "PRAIRIE AVE" are highlighted in the map image 21. Thus, the navigation system indicates that the vehicle should make a left turn at the intersection. This example further shows an arrow indicating the direction (left) in which the vehicle is to turn at the intersection in a message box 22 at the top of the screen. The message box 22 also shows a name of the street which intersects with the current street and a distance to the intersection.

When a vehicle is in motion, setting the navigation functions poses a problem to a user. Actions for setting the navigation functions, such as finding points of interest (POI) or recently-used addresses, can be dangerous because such operation distracts the user's attention to driving. To operate the navigation system, the user must choose a desired entry from various categories or entries. This step requires the user to look at the monitor screen and find a desired entry from a plurality of categories or entries. Then, the user selects the entry on the monitor screen through input means such as a touch screen, a hardswitch on the panel, or a remote controller. Thus, for safe driving, a driver should be prohibited to operate the navigation system to a certain degree.

On the other hand, if the vehicle navigation system prohibits all the access to the navigation functions when the vehicle is in motion, the utility of the navigation system is diminished significantly. Such prohibition also frustrates the user since the user cannot use the navigation system unless the user stops the vehicle. Thus, overly limiting the access to the navigation functions can reduce the usefulness of the navigation system while allowing access to all functions will excessively distract the driver. Accordingly, the scope of access to the navigation functions must be balanced between the safety of driving and the usefulness of the vehicle navigation system.

In the conventional vehicle navigation system, access to the navigation system is mostly limited while the vehicle is in motion. In most cases, access to many functions of the navigation systems are simply locked out when the vehicle is in motion while allowing access to all of the functions when the vehicle is stationary. Thus, the user is unable to input new entries or change the entries in the navigation system at all when the vehicle is moving.

Even when the navigation system allows some access to the navigation functions, the scope of access is often arbitrary. For example, while the vehicle is in motion, a vehicle navigation system may allow the driver to select recently used addresses listed on the monitor while other functions are restricted. However, it is questionable whether this conventional approach achieves a balance between safety and usefulness.

For example, the conventional method does not take the surrounding driving conditions into account. When the vehicle is in motion, the surrounding circumstance and conditions change continuously. Speed, road conditions, and surrounding vehicles are examples that would affect the safety of driving and, thus, a scope of access to the navigation functions. There are other parameters, such as experience, age, physical conditions of the driver that affect the driving.

Accordingly, merely classifying whether the vehicle is in motion or stationary fails to provide adequate guideline for setting the scope of the access. Therefore, it is desirable to assign different degrees of access to the navigation functions based on the driving environment and conditions. For instance, when other vehicles are far away from the user's vehicle, the risk of traffic accident is relatively low and some vehicle navigation functions should be made available to the user.

Moreover, as described above, finding a desired entry out of a plurality of categories or entries, and selecting the entry through a touch-screen or other input means poses hardship to the user when the number of entries is large. The more the entries are available, the harder it becomes for the user to find a desired entry and to select it. Such distraction amounting to a relatively long time is undesirable while the vehicle is in motion. Thus, it is desirable to facilitate easy selection by reducing the number of allowable entries, thereby avoiding the distraction from the safe driving.

SUMMARY OF THE INVENTION

The present invention aims to provide a vehicle navigation method and system that resolves the above described drawbacks of the conventional vehicle navigation system in terms of the scope of access to the navigation functions while the vehicle is in motion.

Thus, it is an object of the present invention to provide a navigation method and system which is capable of dynamically changing the scope of access to the navigation functions based on driving environment and conditions.

It is another object of the present invention to provide a navigation method and system which is capable of displaying the scope of access based on driving environment and conditions to allow operations with minimum number of key operations.

It is a further object of the present invention to provide a navigation method and system which is capable of displaying the scope of access based on driving environment and conditions to induce the user not to operate the navigation system continuously while the vehicle is in motion.

One aspect of the present invention is a navigation method which allows dynamic access to different degrees of navigation functions while a vehicle is in motion based on the surrounding vehicles and obstacles as detected by sensors provided on the vehicle. The navigation method includes the steps of detecting whether the user vehicle is in motion or stationary, detecting other vehicles and obstacles surrounding the user vehicle by a sensor and measuring distances therefrom when the vehicle is in motion, evaluating resultant data from the sensor and determining a range of driving conditions, and changing a degree of accessibility to navigation functions based on the range of the driving conditions and displaying entries on a monitor of the navigation system where the entries that can be selected are limited by the degree of accessibility.

In the navigation method of the present invention, a number of the entries that can be displayed on the monitor of the navigation system when the vehicle is in motion is smaller than that can be displayed on the monitor when the vehicle is stationary. In the process of changing the degree of accessibility to the navigation functions, the navigation method displays accessible entries on the monitor while disabling accessibility to other entries in response to the range of driving conditions.

In the process of determining the range of driving conditions, the navigation method produces two or more different ranges of driving conditions in response to results of evaluating the data from the sensor. The navigation methods prohibits any access to the navigation functions when the range of driving conditions indicates that a risk involved is highest.

In the process of changing the degree of accessibility to the navigation functions, the navigation method assigns an initial highlight position to an entry at a center of accessible entries on the monitor. Further, the navigation method changes the highlight position on the accessible entries in a closed loop manner so that the highlight position continuously moves in an upward or downward direction in response to user's key operations.

Preferably, the navigation method assigns a most frequently used entry to a center of the monitor and entries next frequently used to near the center of the monitor and assigning an initial highlight position on the entry at the center of the monitor, thereby minimizing a number of key operations for selecting an entry.

In the process of changing the degree of accessibility to the navigation functions, the navigation method displays an enabled area consisting of accessible entries and a disabled area consisting of non-accessible entries and shifting the enabled area at a predetermined delay time after positioning a highlight on an end of the enabled area, thereby directing the user to concentrate on the driving.

Another aspect of the present invention is a navigation system which allows dynamic access to different degrees of navigation functions while a vehicle is in motion based on the surrounding vehicles and obstacles as detected by sensors provided on the vehicle. The navigation system is comprised of various means for implementing the navigation method described above, thereby achieving an excellent balance between the safety of driving and the utility of the vehicle navigation system.

According to the present invention, the navigation method and system allows dynamic access to different degrees of navigation functions when the vehicle is in motion based on the conditions surrounding the vehicle such as distances from other vehicles and obstacles detected by sensors provided on the vehicle. When the degree of risk involved is high, the access to the navigation functions is further limited, and when the degree of risk is low, a scope of the access to the navigation functions is increased. Thus, the user is able to select and set an entry quickly without being distracted from driving. Further, the navigation method and system of the present invention is designed to minimize the number of key operations which also reduces the time for selecting and setting the entry. Furthermore, the navigation method and system of the present invention is designed to discourage the user from continuously looking at the display screen by delaying the screen update, thereby avoiding distraction from the driving.

BRIEF DESCRIPTION OF THE DRAWINGS

FIG. 11A shows an example of "In-Motion Top Menu" screen, FIG. 11B shows an example of "Nearest POI Locations" screen, and FIG. 11C shows an example of "Nearest POI Locations" screen.

FIGS. 12A, 12B and 12C show examples of the display of the navigation system of the present invention where the degree of risk posed by the obstacles around the vehicle is the second highest. FIG. 12A shows an example of "In-Motion Top Menu" screen, FIG. 12B shows an example of "Nearest POI Locations" screen, and FIG. 12C shows an example of "Nearest POI Locations" screen.

FIGS. 20A, 20B and 20C are schematic diagrams showing an example of delayed screen update function in the navigation system of the present invention. FIG. 20A shows an example where entries in middle three rows are accessible, FIG. 20B shows an example where a highlight is on the bottom row among the middle three rows, and FIG. 20C shows an example where accessible three rows are shifted after a predetermined delay time.

DETAILED DESCRIPTION OF THE INVENTION

The navigation method and system of the present invention is explained in more detail with reference to the accompanying drawings. The navigation method and system of the present invention is designed to allow settings of all of the navigation functions when the vehicle is stationary whereas to allow dynamic access to different degrees of navigation functions when the vehicle is in motion based on the surrounding vehicles and obstacles detected by sensors provided on the vehicle. A plurality of sensors are provided around the vehicle to detect the conditions surrounding the vehicle.

It should be noted that such restriction against the navigation functions is done when a user wants to input a destination in a navigation system, select menus, or change settings of the navigation system, and the like. Thus, if the navigation system is already in the route guidance mode, because the destination is already set, the route guidance function is unaffected by the surrounding conditions.

Figure 8:
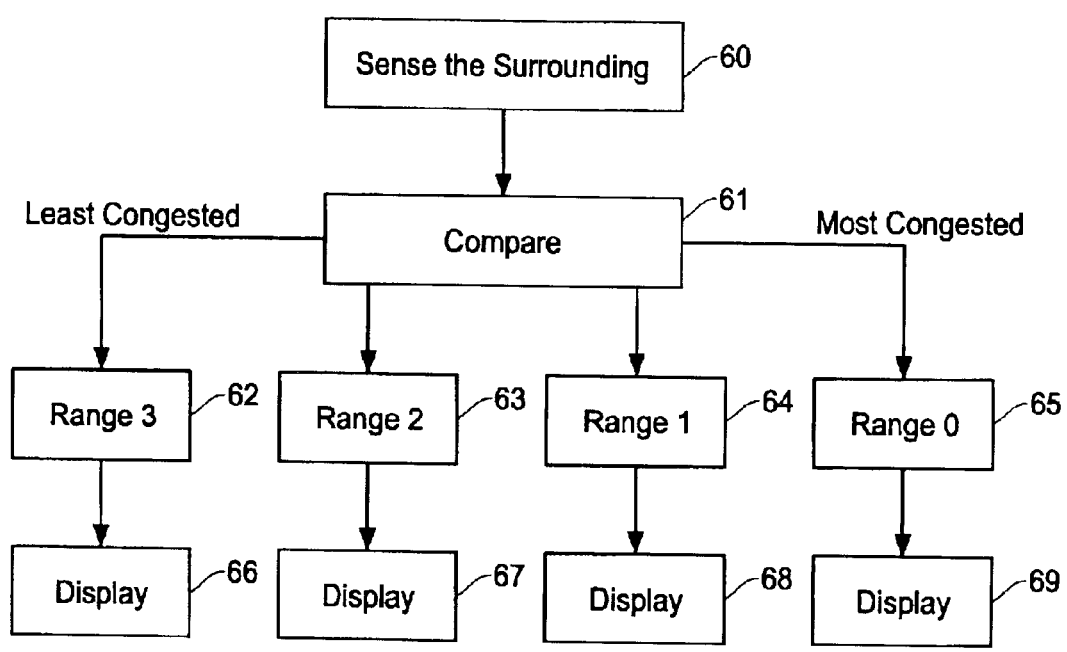
FIG. 8 is a flow chart describing the basic steps taken by the navigation method and system of the present invention to sense the surrounding conditions and change the display based on the surrounding conditions.

First, the basic flow of the vehicle navigation system of the preset invention is explained with reference to FIG. 8. The sensors provided around the vehicle detects the presence and distances of other vehicles or obstacles (step 60). The data detected by the sensors is evaluated and compared with predetermined reference data to determine the degree of risk posed by the surrounding conditions of the vehicle (step 61).

In the case where other vehicles or obstacles are far away from the vehicle, the degree of risk posed by the surrounding conditions is deemed low. In contrast, if other vehicles or obstacles are close to the vehicle, the degree of risk posed by the surrounding conditions is deemed high. In the preferred embodiment, the level of driving conditions is numbered from range 0 to range 3 to express the different degrees of risk posed by the surrounding conditions (steps 62–65). Hereafter, this range may also be referred to as "driving condition range".

The driving condition range 3 indicates that the obstacles or other vehicles are most sparse and the degree of risk posed by the surroundings is minimum (lowest). The driving condition range 0 indicates that the obstacles or other vehicles are least sparse and the degree of risk posed by the surroundings is maximum (highest). The driving condition ranges 2 and 1 are in-between the driving condition ranges 0 and 3. Thus, the driving condition range 2 indicates the risk higher than the range 3 but not as high as the range 1 (second lowest). The driving condition range 1 indicates the risk higher than the range 2, but not as high as the range 0 (second highest). When the driving condition range noted above is determined, the result is reflected on the display (steps 66–69) of the vehicle navigation system, i.e., available functions, as will be described in detail below.

The classification of the driving condition range noted above may be affected by other factors such as driver characteristics and vehicle performance. As examples of driver characteristics, the following factors may affect the driving performance and thus affect the range setting: age, gender, height, chronic health conditions such as vision, hearing, stress and arthritis, personality, driving experience level, preferences such as speed, lane and headlight use, mood, emotion, health conditions, alcohol and drug use. Such factors may be input in the navigation system by the user which will be incorporated in determined the reference data noted above.

Moreover, a device to measure such factors affecting the driving performance may be provided to the navigation system. Such measurements include: a reaction time determined by a time lag from the moment the sensor detects the change in the relative speed of the surrounding traffic to the moment the driver adjusts the speed; operations of gas pedal and brake pedal determined by high acceleration, sudden brakes, frequent speed changes, constancy of speed; operations of clutch and shift lever; use of cruise control as it can indicate driver's attention and alertness; use of turn signals; and use of navigation system, audio device, A/C, and other controls as these actions indicate driver's attention and distraction. Any deviation from the normal range in the above measurements might suggest temporary reduction of the driver's ability.

The factors concerning the vehicle performance that can influence the classification of the driving condition range include: vehicle model, safety features, vehicle weight, load balance, street conditions, weather, acceleration deceleration performance, engine transmission condition, vehicle control systems, vehicle vibration and driving noise to evaluate street surface, tire conditions, and wind. It is preferable to take into account all those variables to determine the driving conditions in order to give an accurate scope of access to the user while the vehicle is in motion. However, providing all equipment necessary to measure and evaluate such parameters in the navigation system is costly and impractical.

In the preferred embodiment, sensor units used in an adaptive cruise control apparatus is incorporated in the navigation system to determine the surrounding driving conditions. The adaptive cruise control is a technology that automatically adjusts the vehicle speed to maintain a driver-selected distance from the vehicle ahead. In the conventional adaptive cruise control, sensors using radar beams are provided to assist in locating the closest vehicle or other obstacles. In the present invention, one or more radar sensors are arranged around the vehicle to locate obstacles around the vehicle and measure the distances from the obstacles.

Figure 1A:
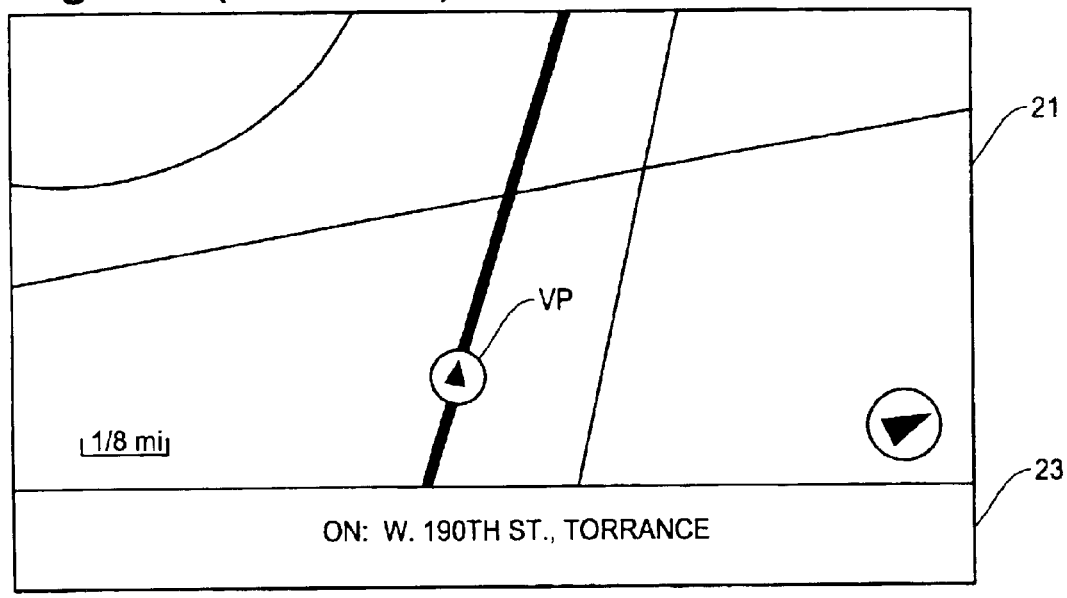
FIGS. 1A and 1B are schematic diagrams showing an example of locator map display and route guidance display, respectively, of a navigation system.
Figure 1B:
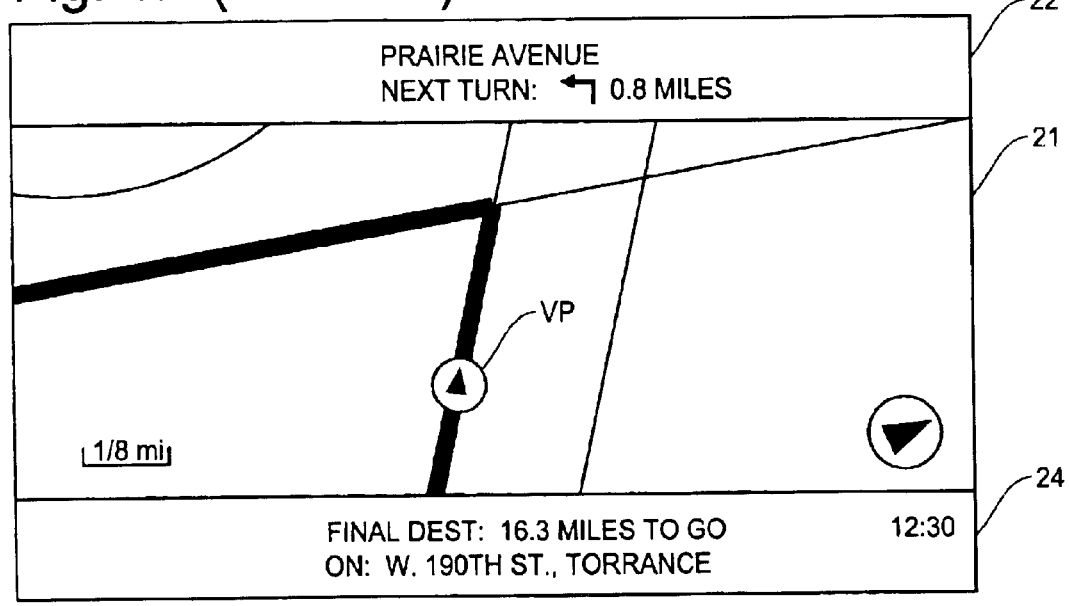
Figure 2:
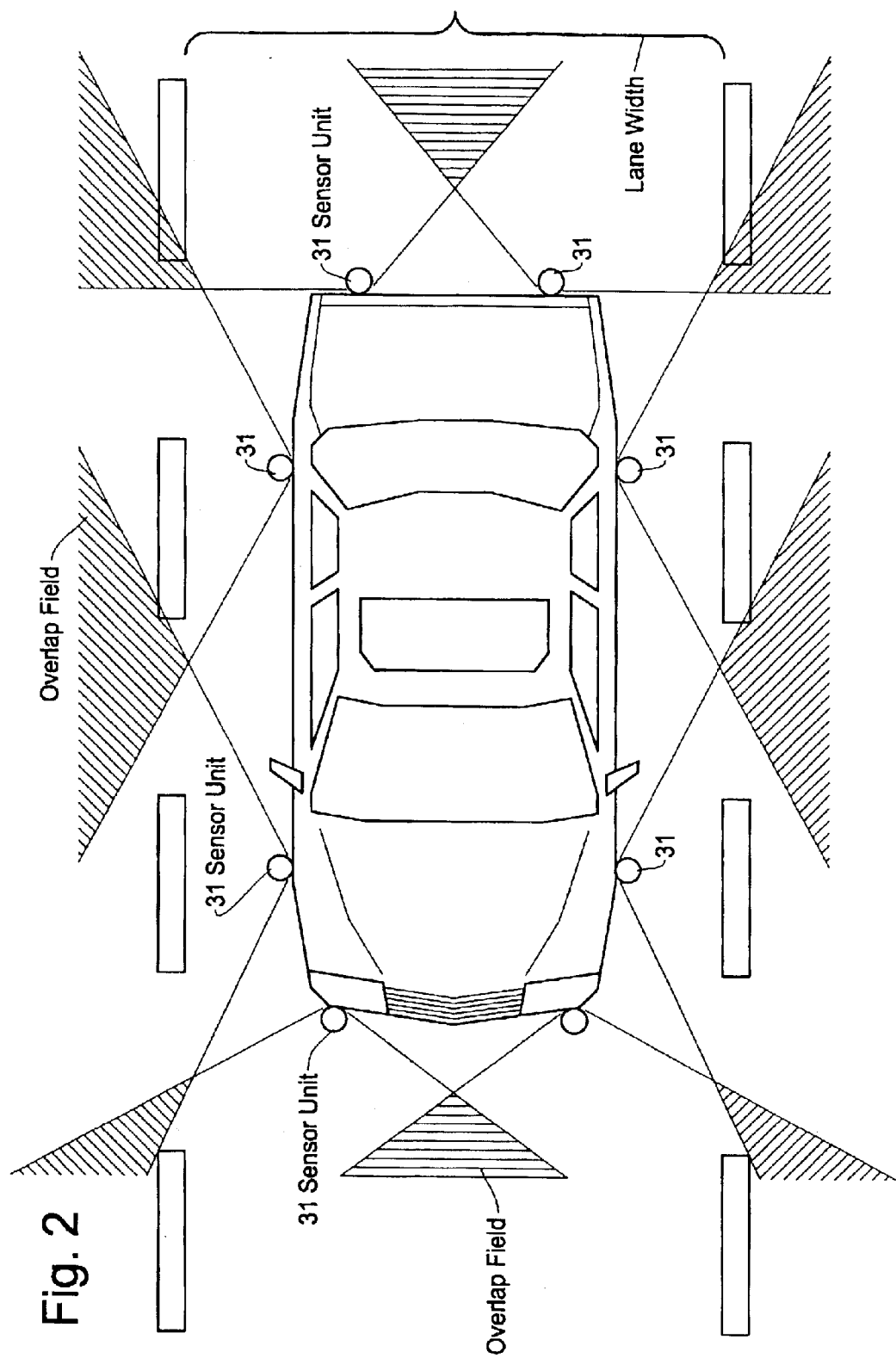
FIG. 2 is a diagram showing an example of arrangement of sensors installed on a vehicle for use with the navigation system of the present invention and a coverage scope of each sensor provided on the vehicle.
Figure 3:
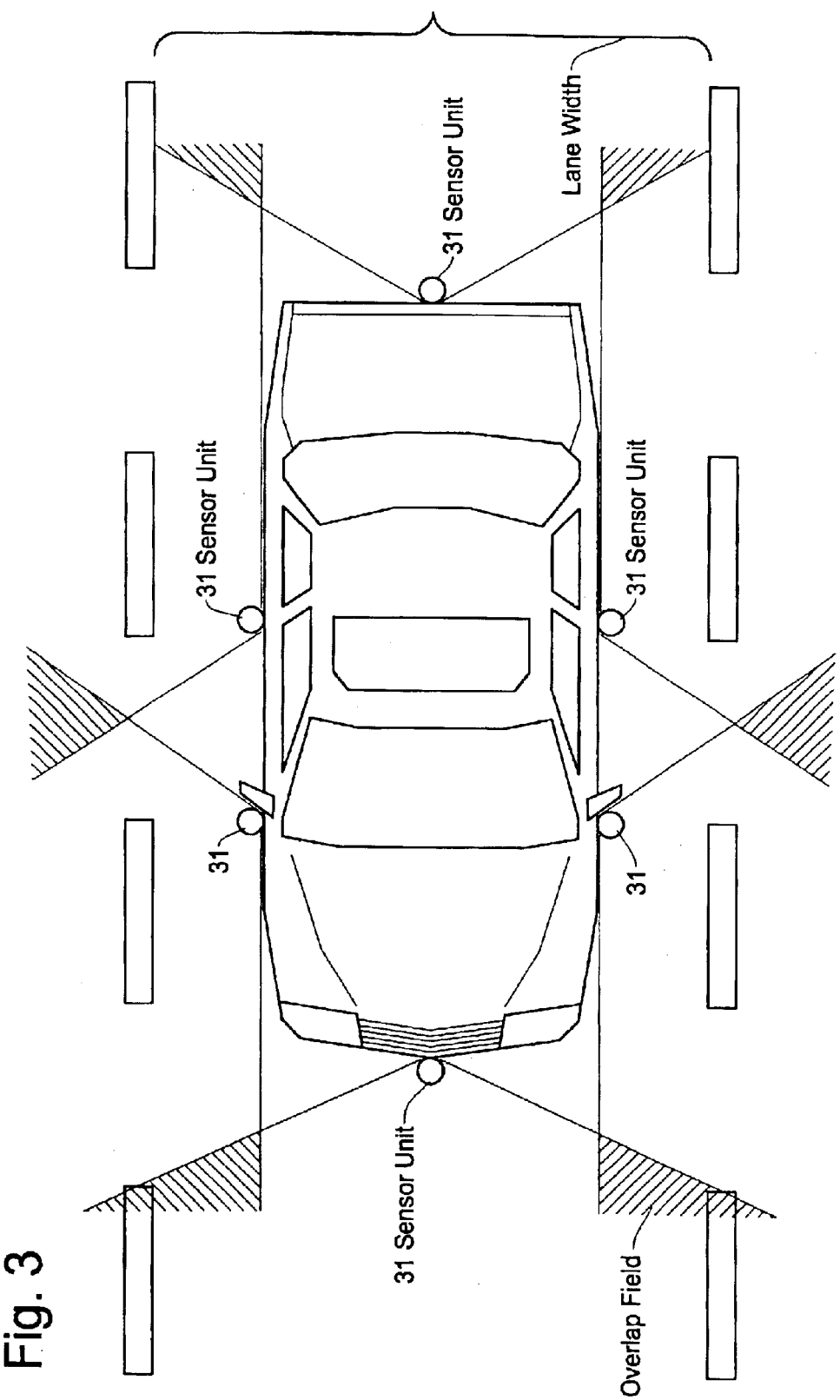
FIG. 3 is a diagram showing another example of arrangement of sensors installed on a vehicle for use with the navigation system of the present invention and a coverage scope of each sensor provided on the vehicle.

FIGS. 2 and 3 show an example of arrangement of sensors on the vehicle to evaluate the surrounding conditions for implementing the present invention. FIG. 2 is an illustration showing sensor units 31 installed on a vehicle. Lane markings are shown at both sides of the vehicle. In the example of FIG. 2, eight sensor units 31 are installed around the vehicle. Each sensor unit 31 emits a radar beam to find other vehicles and measure the distances from the other vehicles by evaluating the reflected radar beams. Overlapping fields created by a plurality of radar beams are shadowed by the hatching in FIG. 2.

FIG. 3 is another illustration showing the sensor units 31 installed on the vehicle. Lane markings are shown at both sides of the vehicle. In FIG. 3, six sensor units 31, instead of eight in FIG. 2, are installed around the vehicle. Each sensor unit 31 emits the radar beams and measures the reflected radar beams to find other vehicles and measure the distance between the user's vehicle and other vehicles. Overlapping fields created by the plurality of radar beams are shadowed by the hatching in FIG. 3.

In this manner, the present invention can be implemented by the sensor arrangements described above with reference to FIGS. 2 and 3 in order to detect the surrounding vehicles and measure the distances between the user's vehicle and the surrounding vehicles. Other sensor arrangements are also feasible to evaluate the distances between the user's vehicle and the surrounding vehicles. For example, the present invention can be implemented with the sensors only in the front of the vehicle to detect the presence of vehicles in the front of the user's vehicle, although the sensor arrangements shown in FIG. 2 or 3 are preferable.

Figure 4:
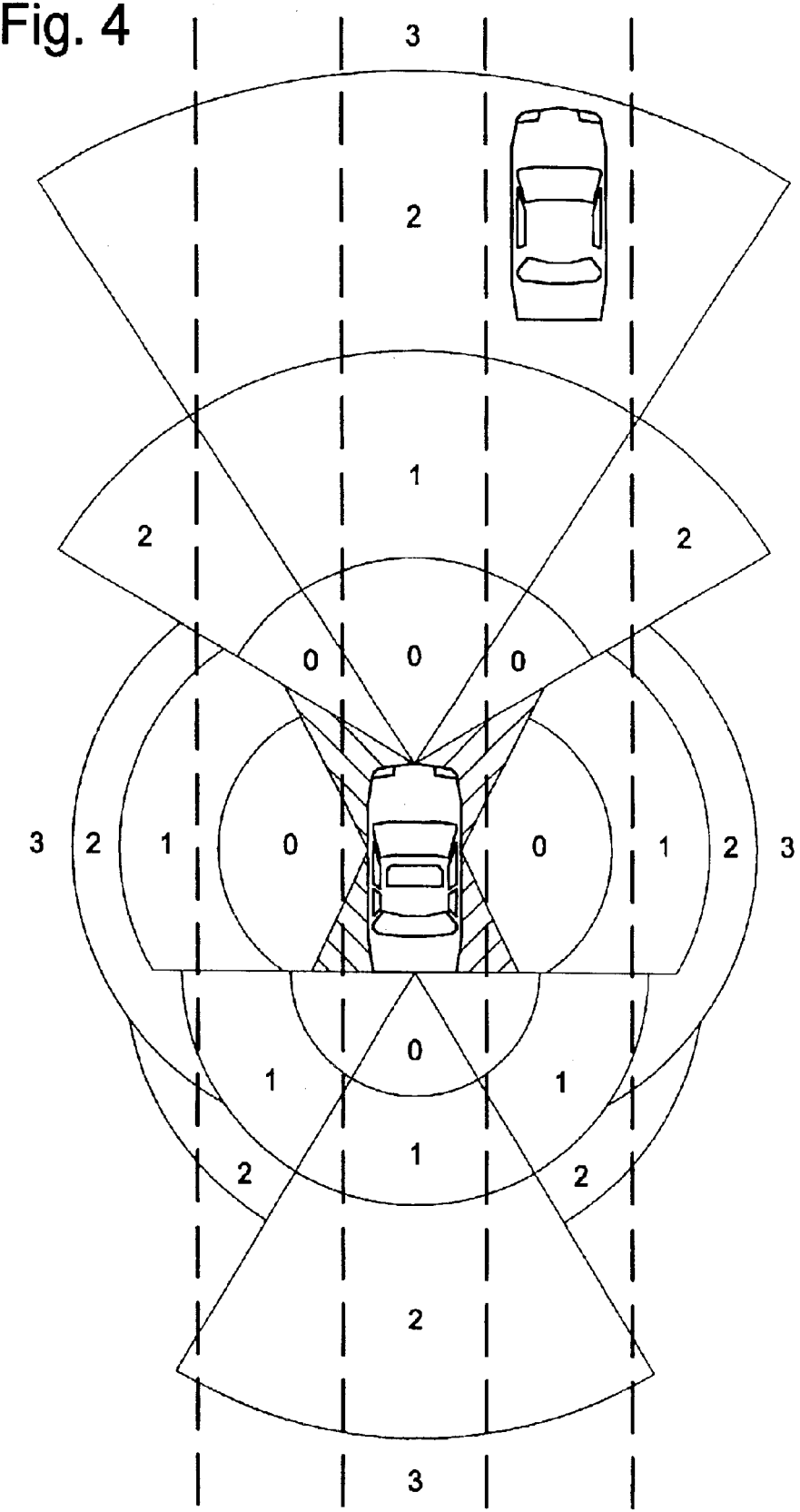
FIG. 4 is a diagram showing an example of sensor scopes and range allocations of sensors provided on the vehicle to perceive conditions surrounding the vehicle in the present invention.

FIG. 4 is a diagram showing the relationship between the vehicle and the driving condition ranges around the vehicle in the present invention. As shown, the area around the vehicle is classified into the driving condition ranges 0 to 3. In this example, the sensors are provided at the front, rear and both sides of the vehicle. Thus, the driving condition ranges 0–3 are assigned to the areas in the front, back and right and left sides of the vehicle.

The driving condition range 0 indicates that another vehicle is close to the vehicle, thus, the degree of risk posed by the obstacles around the vehicle is the highest. The driving condition range 0 indicates that the driver should concentrate on driving rather than operating the navigation functions. Thus, the scope of access to the navigation functions is zero. In the driving condition range 1, the degree of risk posed by the obstacles around the vehicle is the second highest. Access to the navigation functions is possible but its scope is accordingly very limited, as will be described in detail later.

In the driving condition range 2, the degree of risk posed by the obstacles around the vehicle is the second lowest. The scope of access to the navigation functions is set accordingly, as will be described in detail later. In the driving condition range 3, the degree of risk posed by the obstacles around the vehicle is the lowest. The scope of access to the navigation functions is set accordingly, which is least limited as will be described in detail later. In the example of FIG. 4, driving condition range is 2 because another vehicle is in the scope range 2.

Figure 5:
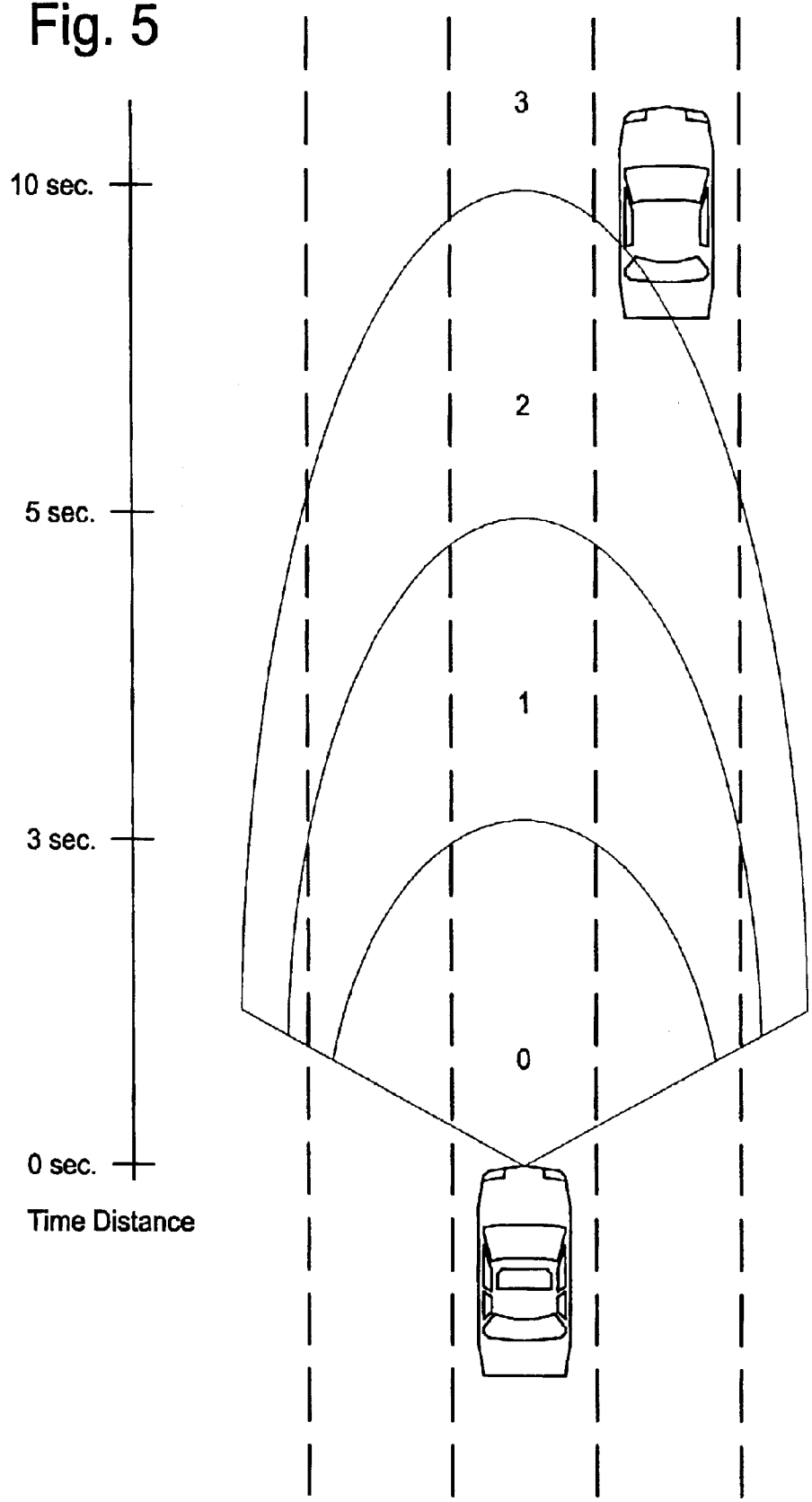
FIG. 5 is a diagram showing another example of sensor scopes and range allocations of sensors provided on the vehicle to perceive conditions surrounding the vehicle in the present invention.

FIG. 5 is a diagram showing another example of relationship between the vehicle and the driving condition ranges in the present invention. In this example, the sensor is provided only to monitor the conditions in the front of the vehicle. Thus, obstacles only in the front area of the user's vehicle is taken into consideration. As shown, the area in the front of the vehicle is classified into the driving condition ranges 0 to 3.

Similar to the example of FIG. 4, the driving condition range 0 indicates that another vehicle is close to the vehicle, thus, the degree of risk posed by the obstacles around the vehicle is the highest. In the driving condition range 1, the degree of risk posed by the obstacles around the vehicle is the second highest. In the driving condition range 2, the degree of risk posed by the obstacles around the vehicle is the second lowest. In the driving condition range 3, the degree of risk posed by the obstacles around the vehicle is the lowest. In the example of FIG. 5, another vehicle in front of the user's vehicle poses the driving condition range 3.

Figure 6:
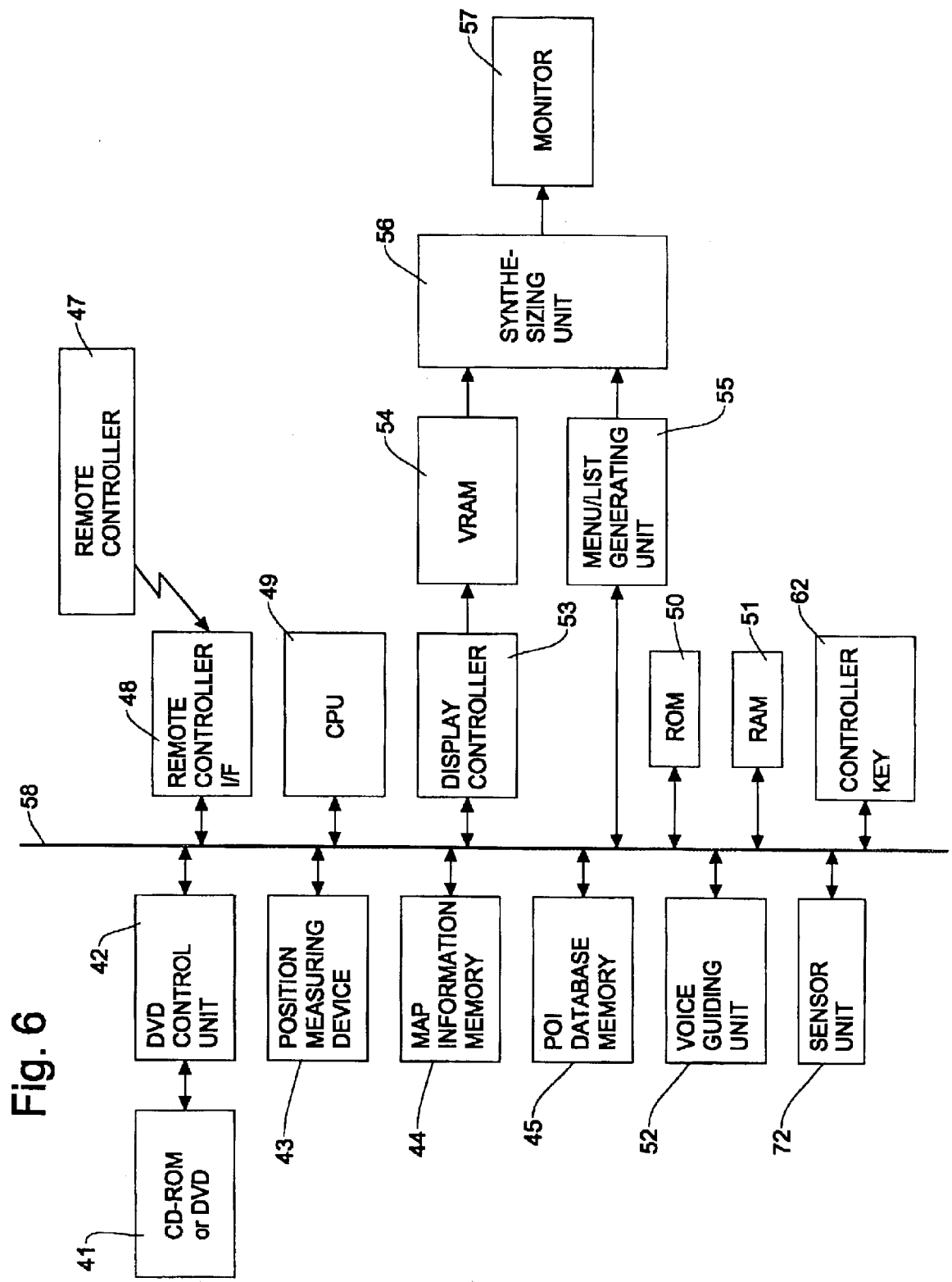
FIG. 6 is a block diagram showing an example of structure in the vehicle navigation system according to the present invention.

FIG. 6 is a block diagram showing an example of structure of the vehicle navigation system of the present invention. The navigation system includes a storage medium 41 such as a CD-ROM, hard disc or DVD (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, and etc. The navigation system determines whether the vehicle is in motion or stationary based on, for example, a signal from the vehicle speed sensor in the position measuring device 43.

The block diagram of FIG. 6 further includes a map information memory 44 for storing the map information which is read out from the DVD 41, a database memory 45 for storing database information such as point of interest (POI) information from the DVD 41. The navigation system includes a remote controller 47 for executing a menu operation. A remote controller interface 48 is provided in the block diagram for interfacing the remote controller 47 and the navigation system.

The navigation system further includes a processor (CPU) 49 for controlling an overall operation of the navigation system, a ROM 50 for storing various control programs such as a route search program and a map matching program necessary for navigation control and the program for dynamic access to the navigation function to implement the present invention, a RAM 51 for storing a processing result such as a calculated route to the destination, a voice guiding unit 52 for guiding a traveling direction at an intersection with spoken instructions, a display controller 53 for generating map images (such as a map guide image and an arrow guide image) on the basis of the map information, a VRAM 54 for storing the images generated by the display controller 53, a menu/list generating unit 55 for generating menu image/various list images, a synthesizing unit 56 for synthesizing images from the VRAM 54 and the menu/list generating unit 55, a monitor (display) 57, and a bus 58 for interfacing the above listed units in the navigation system.

A sensor unit 72 preferably includes six or eight sensors as shown in FIGS. 2 and 3. Each sensor emits a radar beam and evaluates a reflected radar beam to detect nearby vehicles and other obstacles and measures the distances therefrom. The result obtained by the sensor unit 72 is evaluated by the program stored in the ROM 50 or equivalent storage device by means of the CPU 49. According to the evaluation, the CPU 49 prompts the display controller 53 to change the display on the monitor 57 to dynamically control the degrees of availability of the navigation functions. This procedure is repeated constantly to accommodate changes in the driving conditions while the vehicle is in motion.

Figure 7A:
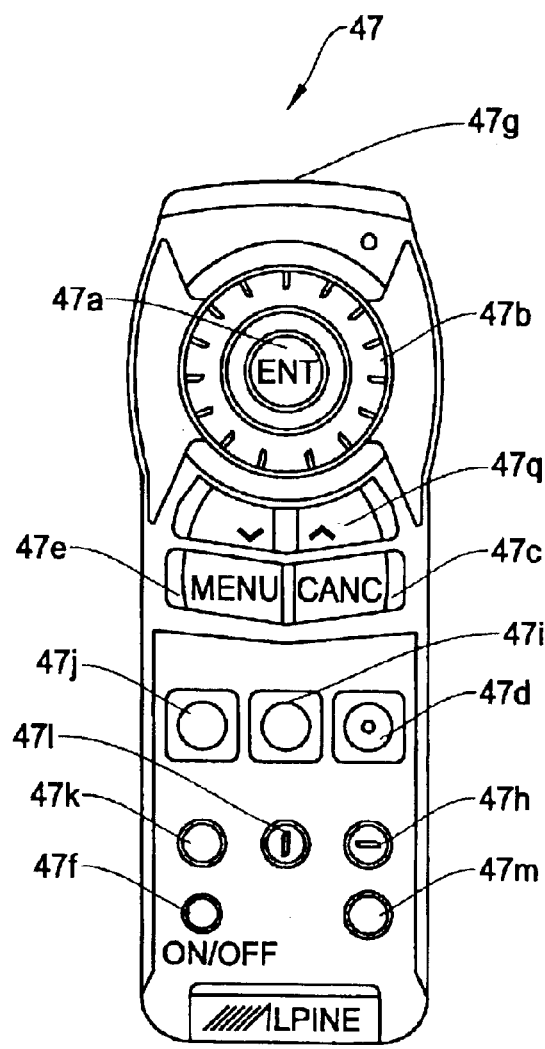
FIGS. 7A and 7B are diagrams showing an example of remote controller accompanied by the vehicle navigation system of the present invention.
Figure 7B:
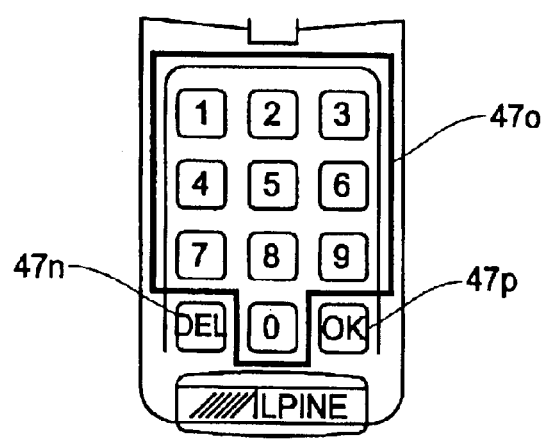

FIGS. 7A and 7B show an example of a remote controller that is used for selecting menus, executing selected functions and etc. in the navigation system of the present invention. The remote controller 47 has a variety of function keys as shown in FIG. 7A and numeric keys as shown in FIG. 7B. The numeric keys appear when a lid in the lower part of FIG. 7A is opened. The remote controller 47 includes a joystick/enter key 47a, a rotary encoder 47b, a cancel key 47c, an MP/RG key 47d, a menu key 47e, a zoom/scroll key 47q, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h starts the guidance to the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same or similar operations done through the remote controller 47. For example, the navigation system includes hard keys and a joystick on a head unit of the navigation system mounted on a dashboard, a touch screen of the display panel, and voice communication means having a voice recognition device.

Figure 9A:
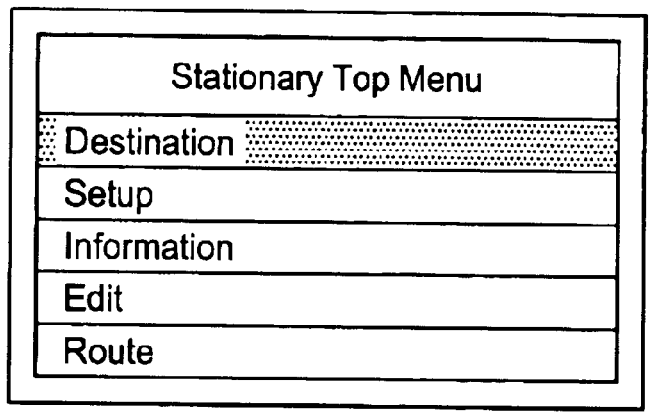
FIGS. 9A and 9B are diagrams showing examples of display of the navigation system in the present invention when the vehicle is stationary.
Figure 9B:
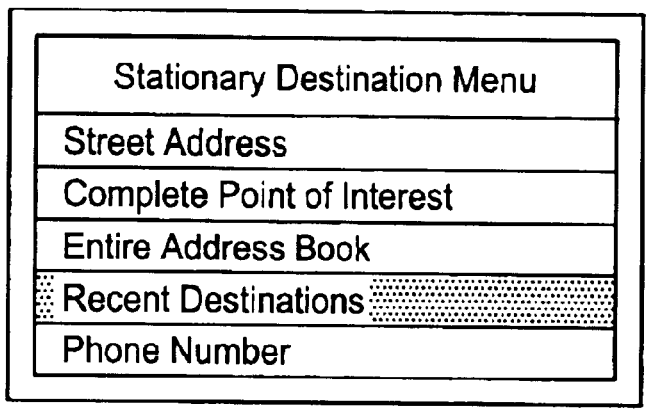

Based on the structure of the navigation system described above with reference to FIGS. 6 and 7A–7B, the navigation method and system of the present invention is explained with reference to FIGS. 9–20. FIGS. 9A and 9B show an example of "Stationary Top Menu" screen and an example of "Stationary Destination Menu" screen, respectively, that will be displayed when the vehicle is stationary. The "Stationary Destination Menu" screen of FIG. 9B is displayed when "Destination" is selected in the screen of FIG. 9A. When the vehicle is stationary, all of the functions of the navigation system are available without limit.

Figure 10:
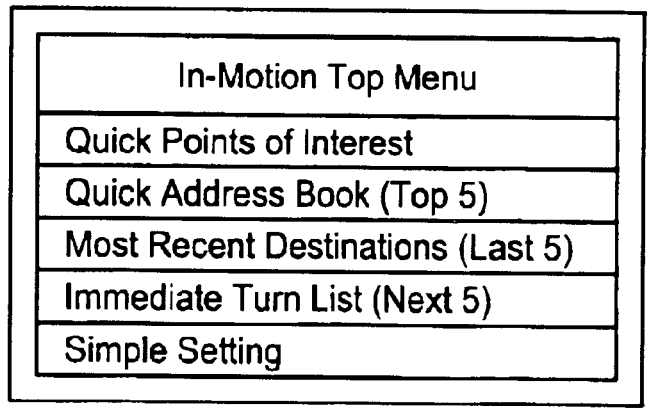
FIG. 10 is a diagram showing an example of display of the navigation system of the present invention when the vehicle is in motion and the degree of risk posed by the obstacles around the vehicle is the lowest.

FIG. 10 shows an example of "In-Motion Top Menu" screen of the navigation system of the present invention when the vehicle is in motion and the driving condition is in the range 3. As described above, the driving condition range 3 indicates that the degree of risk posed by the obstacles around the vehicle is the lowest. Accordingly, all of the navigation functions may be accessible within a limited range.

In the menu screen, the user can select one of the entries by operating, for example, the scroll key 47q and pressing the enter key 47 of the remote controller 47. When the user moves the highlight to the top and presses the scroll key upward again, the highlight moves to the bottom. Likewise, when the user moves the highlight to the bottom and further presses the scroll key downward again, the highlight moves to the top. Thus, continuous up or down movement produces a closed loop like movement of the highlighted position in the upward direction or downward direction. This situation is expressed by the circular arrows at the right side of the screen.

Thus, in the example of FIG. 10, "Quick Points of Interest," "Quick Address Book (Top 5)," "Most Recent Destinations (Last 5)," "Immediate Turn List (Next 5)" and "Simple Setting" will be highlighted in sequence by pressing the scroll key or up/down keys. It should be noted that in the stationary condition of FIGS. 9A–9B where all the functions of the vehicle navigation are accessible, each menu has more entries and the lists can be scrolled down to show all available entries. In the example of FIG. 10, however, the accessible menus are limited to a predetermined number such as five on the screen since the driving condition is in the range 3. Thus, the user can select only one out of the five entries on the display because scrolling down the lists can be too distracting from the driving.

Figure 11A:
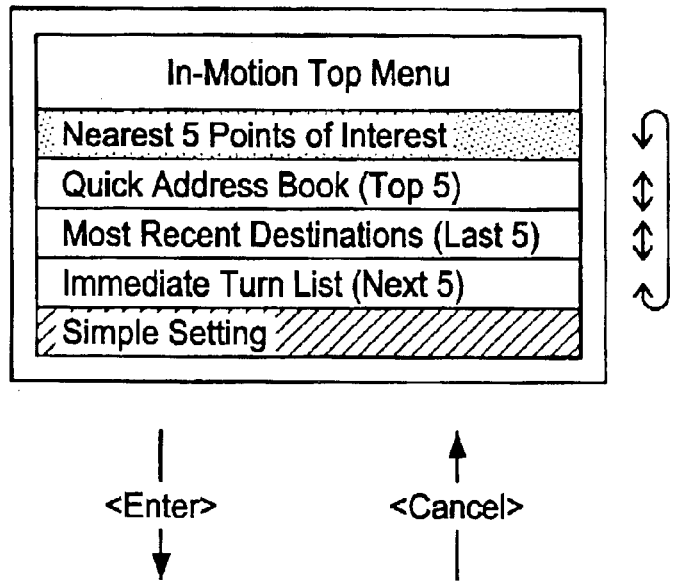
FIGS. 11A, 11B and 11C show examples of the display of the navigation system of the present invention where the degree of risk posed by the obstacles around the vehicle is the second lowest.
Figure 11B:
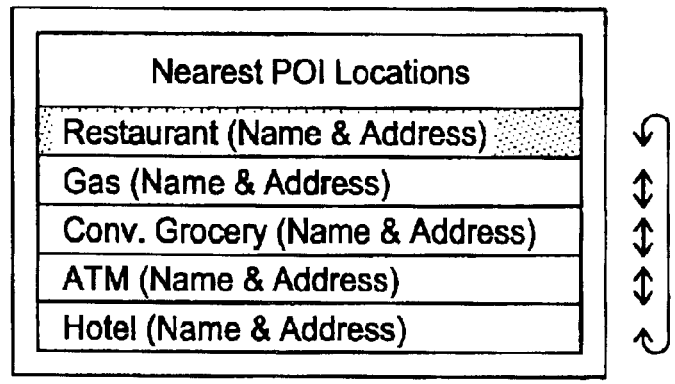
Figure 11C:
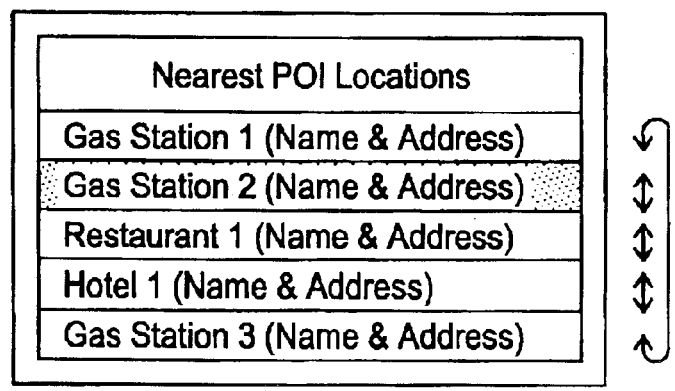

FIGS. 11A, 11B and 11C show examples of display on the monitor of the navigation system of the present invention when the vehicle is in motion and the driving condition is in the range 2. As described above, the driving condition range 2 indicates that the degree of risk posed by the obstacles around the vehicle is the second lowest, i.e, higher than the range 3. Accordingly, some of the navigation functions may be accessible although not as much as in the range 3.

In those and following displays, an entry shaded by diagonal line hatching indicates that such an entry is disabled. Thus, a user cannot select disabled entries. FIG. 11A shows an example of "In-Motion top Menu" screen where "Simple Setting" is disabled. In the example of FIG. 11A, "Nearest 5 Points of Interest," "Quick Address Book (Top 5)," "Most Recent Destinations (Last 5)" and "Immediate Turn List (Next 5)" will be highlighted in sequence by pressing the scroll key (up/down key).

FIG. 11B shows an "Nearest POI Locations" screen in the driving condition range 2. This screen is activated when the highlighted entry "Nearest 5 Points of Interest" menu in FIG. 11A is executed. There is no disabled item in the screen of FIG. 11B. In this screen, only five categories of point of interest (POI) are listed which are pre-selected by a user through a set-up menu (when the vehicle is stationary) or automatically by the navigation system. The user can select one of five categories in the list. The example of FIG. 11C is equivalent to FIG. 11B and shows another example of "Nearest POI Locations" screen which lists five categories of point of interest (POI). The user can select one of five categories in the list.

FIGS. 12A, 12B and 12C show examples of display on the monitor of the navigation system of the present invention when the vehicle is in motion and the driving condition is in the range 1. As described above, the driving condition range 1 indicates that the degree of risk posed by the obstacles around the vehicle is the second highest, i.e., higher than the range 2 above. Accordingly, some of the navigation functions are still accessible although not as much as in the range 2.

Thus, in FIG. 12A, "Most Recent Destinations (Last 5)," "Immediate Turn List (Next 5)" and "Simple Settings" are disabled, while "Nearest 3 Points of Interest" and "Quick Address Book (top 3) are selectable. In the example of FIG. 12A, "Nearest 3 Points of Interest" and "Quick Address Book (Top 3)" will be highlighted in sequence by pressing the scroll key (up/down key).

FIG. 12B shows an "Nearest POI Locations" screen in the driving condition range 1. This menu screen is activated when the entry "Nearest 3 Points of Interest" in FIG. 12A is highlighted and enter key is pressed. In this menu screen, two entries "ATM" and "Hotel" are disabled (diagonal line hatching). Thus, the user can select one of only three categories in the list. The example of FIG. 12C is equivalent to FIG. 12B and shows another example of "Nearest POI Locations" screen which shows a list of five (two of them are disabled) categories of point of interest (POI) different from that of FIG. 12B. The user can select one of only three categories in the list.

Figure 13A:
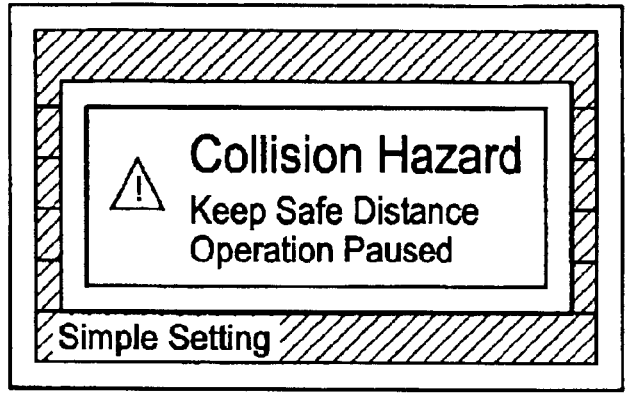
FIGS. 13A, 13B and 13C show examples of display of the navigation system of the present invention where the degree of risk posed by the obstacles around the vehicle is the highest.
Figure 13B:
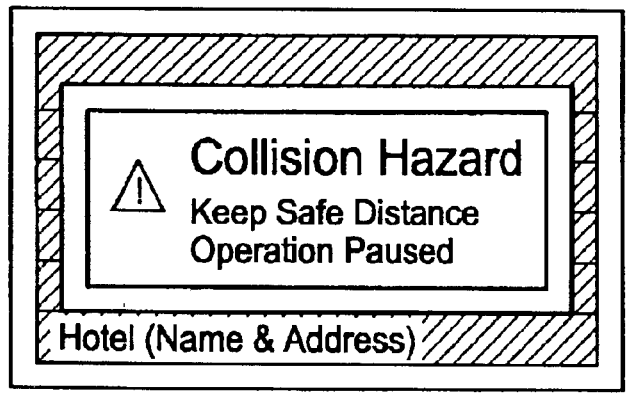
Figure 13C:
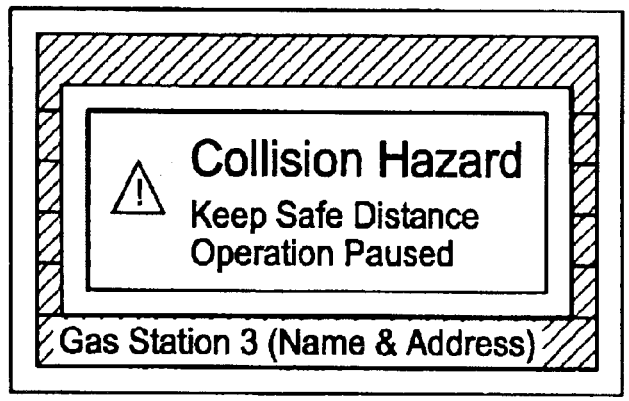

FIGS. 13A, 13B and 13C show examples of display on the monitor of the navigation system of the present invention when the vehicle is in motion and the driving condition is in the range 0. As described above, the driving condition range 0 indicates that the degree of risk posed by the obstacles around the vehicle is the highest. Accordingly, "Collision hazard" warning is displayed and any access to the navigation functions is prohibited.

The displays in FIGS. 13A, 13B and 13C serve to prohibit access to the navigation functions. The user cannot select any entry in the driving condition range 0 since operation of the navigation system by the user is deemed too dangerous under this particular driving condition. When the driving condition range changes from the range 1 to the range 0, the access to the navigation functions is prohibited accordingly. Thus, when the display in FIG. 12A was previously displayed but the driving condition is worsened to the range 0, the monitor changes the display to the screen of FIG. 13A. Likewise, when the display of FIG. 12B was previously displayed, it changes to the screen of FIG. 13B, and when the display of FIG. 12C was previously displayed, it changes to the screen of FIG. 13C in the range 0.

The surrounding condition and environment is constantly monitored in real time to provide most accurate degrees of access to the navigation functions. When the vehicle is in the driving condition range 3 with less obstacles around the vehicle, the screen in FIG. 10 is displayed. The driving conditions change constantly, thus, based on the signals from the sensors, the navigation system may determine that driving condition is now in the range 2 rather than the range 3. In such a situation, more functions will be restricted to avoid distraction of the user from the driving. Thus, the display changes from the one in FIG. 10 to the one in FIGS. 11A–11C.

Likewise, based on the signals from the sensors, the navigation system may determine that driving condition now becomes the range 1 rather the range 2. In this case, some more functions must be restricted to avoid the distraction from the driving. Thus, the display will change from the one in FIGS. 11A–11C to the one in FIGS. 12A–12C. In this manner, when the driving condition is changed, the navigation system detects the changes and dynamically controls the accessible range of the navigation functions.

The surrounding driving condition may improve such as from the range 0 to the range 1, thereby allowing more navigation functions be accessed. In that case, the display in FIG. 13A changes to the display of FIG. 12A. Likewise, when the surrounding condition further changes from the range 1 to the range 2, the display changes from the one in FIG. 12A to the one in FIG. 11A. Similarly, as the driving conditions change, the display changes among the ones in FIGS. 11B, 12B, and 13B, or among the ones in FIGS. 11C, 12C and 13C. In this manner, the display changes in real time as the driving condition changes.

In the foregoing, FIGS. 10–13 show the case in which the navigation system is in the main menu (In-Motion Top Menu), and the "Nearest POI Locations" menu is selected through the main menu. FIGS. 14–16 shows the case in which the navigation system is in "Quick POI Types" menu when the vehicle is in motion. This menu is displayed when the "Quick Points of Interest" entry is selected from the list of "In-Motion Top Menu" of FIG. 10.

Figure 14A:
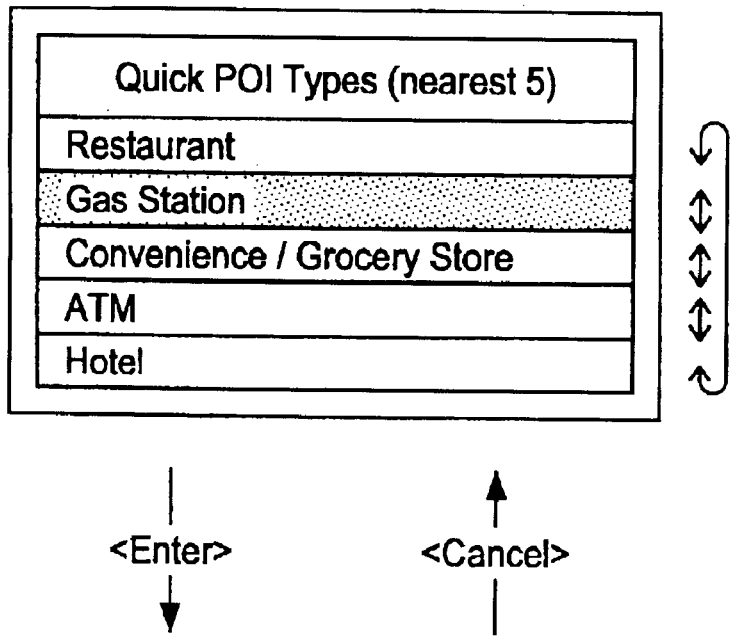
FIGS. 14A and 14B show display examples of "Quick POI Types" screen and "Nearest POI Locations" screen, respectively, of the navigation system of the present invention where the degree of risk posed by the surrounding conditions is the lowest.

FIG. 14A shows an example of "Quick POI Types (Nearest 5)" menu screen of the present invention when the vehicle is in motion and the driving condition is in the range 3. As described above, the driving condition range 3 indicates that the degree of risk posed by the obstacles around the vehicle is the lowest. Accordingly, all of the navigation functions listed on the display can be accessible within a predetermined limitation. This menu lists five categories of the points of interest (POI) as entries.

The circle of arrows at the right side of the screen of FIG. 14A indicates that the highlight on the entries (POI categories) in the list circulates either in the upward direction or downward direction depending on the direction of the scroll key (up/down key) operated by the user. Thus, in the example of FIG. 14A, "Restaurant," "Gas Station," "Convenience/Grocery Store," "ATM" and "Hotel" will be highlighted sequentially as a loop by keep pressing the scroll key.

Figure 14B:
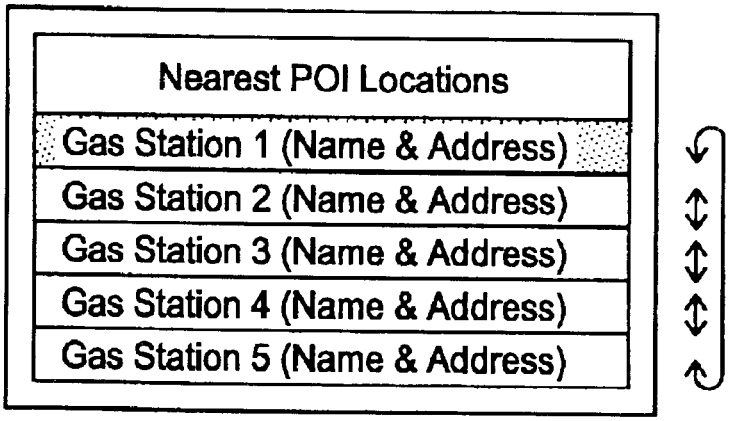

FIG. 14B shows an example of "Nearest POI Locations" menu screen of the present invention when the driving condition is in the range 3. This menu is activated by highlighting the item "Gas Station" and pressing the enter key in FIG. 14A. In this example, five gas stations are listed which are sorted by distance from the current vehicle position. There is no disabled item, thus any gas station in the list can be selected out of five entries. The user may select a desired gas station for route calculation and navigation system guides the user to the selected gas station.

Figure 15A:
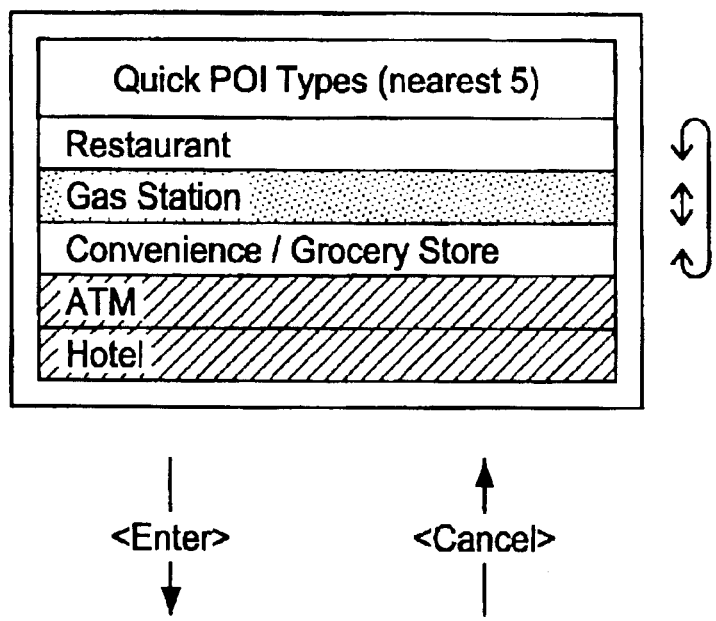
FIGS. 15A and 15B show display examples of "Quick POI Types" screen and "Nearest POI Locations" screen, respectively, of the navigation system of the present invention where the degree of risk posed by the surrounding conditions is the second lowest.
Figure 15B:
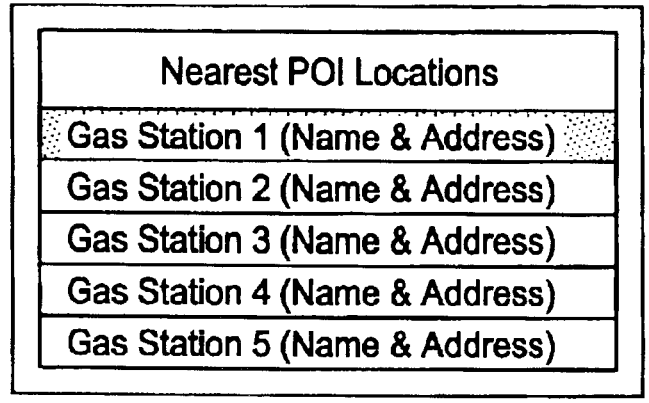

FIGS. 15A and 15B show the display on the monitor of the navigation system of the present invention when the vehicle is in motion and the driving condition is in the range 2. As described above, the driving condition range 2 indicates that the degree of risk posed by the obstacles around the vehicle is the second lowest. Accordingly, some of the navigation functions may be accessible although not as much as in the range 3 shown in FIGS. 14A–14B.

In FIG. 15A, the shade by the diagonal line hatching indicates that the entries are disabled. In this example, the shaded entries, "ATM" and "Hotel" are disabled, thus the user cannot select these POI categories. The user can select which items should be disabled in a set-up process of the navigation system. In the example of FIG. 15A, "Restaurant," "Gas Station" and "Convenience/Grocery Store" will be highlighted in a sequential manner as a closed loop by pressing the scroll key in either upward or downward direction.

FIG. 15B shows an example of "Nearest POI Locations" menu screen when the surrounding driving condition is in the range 2. This menu is activated when highlighting the item "Gas Station" and pressing the enter key in FIG. 15A. In this example, five gas stations are listed which are sorted by distance from the current vehicle position. There is no disabled item, thus any gas station in the list can be selected out of five entries. The user may select a desired gas station for route calculation and navigation system guides the user to the selected gas station.

Figure 16A:
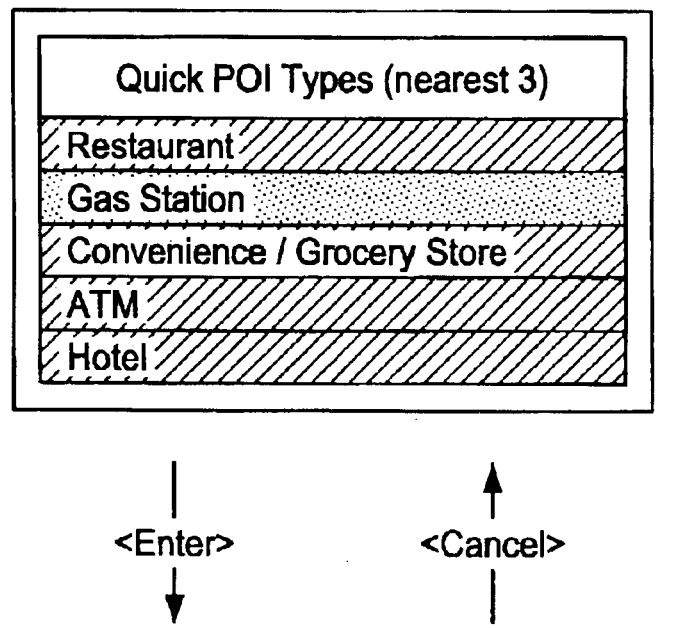
FIGS. 16A and 16B show display examples of "Quick POI Types" screen and "Nearest POI Locations" screen, respectively, of the navigation system of the present invention where the degree of risk posed by the surrounding conditions is the second highest.
Figure 16B:
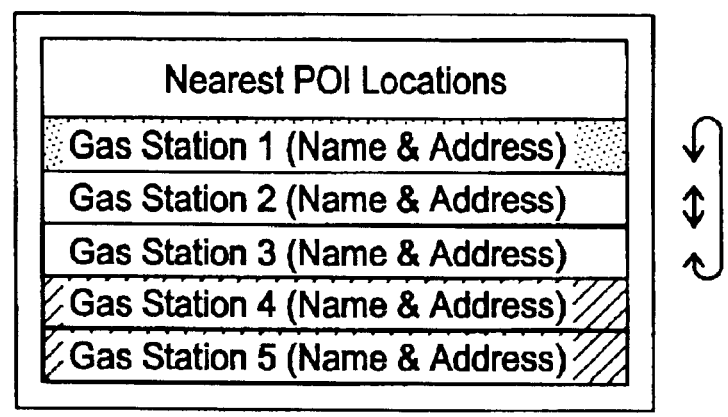

FIGS. 16A and 16B show examples of display on the monitor of the navigation system of the present invention when the vehicle is in motion and the driving condition is in the range 1. As described above, the driving condition range 1 indicates that the degree of risk posed by the obstacles around the vehicle is the second highest, i.e., higher than the range 2. Accordingly, some of the navigation functions may be accessible although not as much as in the range 2 shown in FIGS. 15A–15B.

In FIG. 16A, the categories "Restaurant," "Convenience and Grocery Store," "ATM" and "Hotel" are disabled, thus the user cannot select these POI categories. In this example, only "Gas Station" is highlighted. The user can set which items should be disabled in the set-up process of the navigation system such as when the vehicle is stationary. The driver can select only the currently highlighted POI category "Gas Station". In other words, the scroll key or up/down keys are ignored.

FIG. 16B shows an example of "Nearest POI Locations" menu screen when the surrounding driving condition range is 1. This menu is activated when the highlighted entry in FIG. 16A is entered. In this example, the bottom two entries "Gas Station 4" and "Gas Station 5" are disabled. Thus, three gas stations are listed, one of which will be selected by moving the highlight position in an upward or downward direction. The highlight position will circulate if the user keeps scrolling in either upward or downward direction.

When the driving condition surrounding the vehicle is in the range 0, the degree of risk posed by the obstacles around the vehicle is the highest. In this condition, "Collision hazard" warning is displayed and all of the access to the navigation functions are prohibited. Although not shown here, display example of such a "Collision hazard" warning similar to those shown in FIG. 13A, 13B or 13C will be displayed. Thus, the user cannot select any items or change any settings of the navigation system since such activities distracts the driver's attention from the driving which is deemed dangerous in this particular driving condition.

The surrounding condition and environment is constantly monitored in real time to provide most accurate degrees of access to the navigation functions. For example, when the vehicle was previously in the driving condition range 3, as in FIG. 14A, based on the signals from the sensors, the navigation system may determine that driving condition is now in the range 2. Thus, the display changes from FIG. 14A to FIG. 15A and accessibility to navigation functions is further limited.

Likewise, based on the signals from the sensors, the navigation system may determine that driving condition now becomes the range 1 rather the range 2. In this case, some more functions must be restricted to avoid distraction on the user. The display will change from FIG. 15A to FIG. 16A. In this manner, when the driving condition is changed, the navigation system detects the changes and dynamically controls the accessible range of the navigation functions.

The surrounding driving condition may improve such as from the range 0 to the range 1, thereby allowing more navigation functions be accessed. In that case, the display in FIG. 16A changes to the display of FIG. 15A. Likewise, when the surrounding driving condition further changes from the range 1 to the range 2, the display changes from FIG. 15A to FIG. 14A. Similarly, as the driving conditions change, the display changes among the ones in FIGS. 14B, 15B, 16B and the "Collision Hazard" warning display. In this manner, the display changes in real time as the driving condition changes.

In the foregoing, FIGS. 14–16 show the case in which the navigation system is in the "Quick POI Types" menu and the "Nearest POI Locations" screen is activated therefrom. FIGS. 17–19 show display examples related to the selection menu "Quick Address Book" when the vehicle is in motion. This menu is displayed when the "Quick Address Book" entry is selected from the list of "In-Motion Top Menu".

Figure 17A:
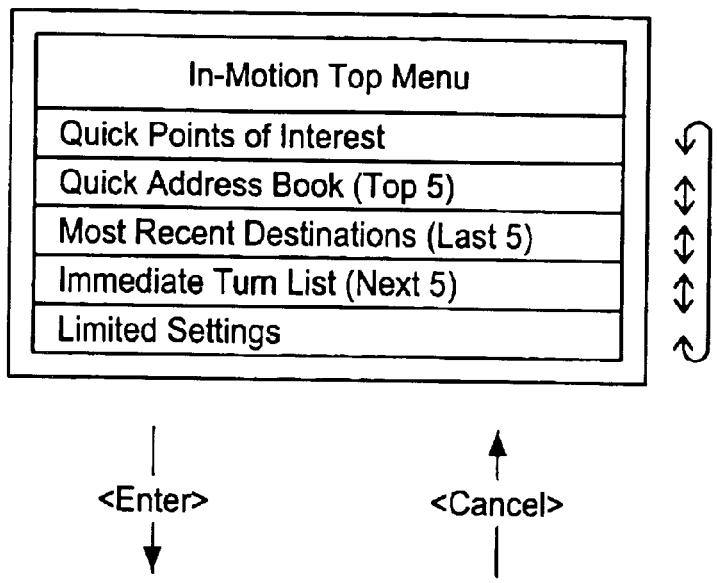
FIGS. 17A and 17B show display examples of "In-Motion Top Menu" screen and "Quick Address Book (Top 5)" screen, respectively, of the navigation system of the present invention where the degree of risk posed by the obstacles around the vehicle is the lowest.

FIG. 17A shows an example of "In-Motion Top Menu" screen in the navigation system of the present invention when the vehicle is in motion and the driving condition is in the range 3. The driving condition range 3 indicates that the degree of risk posed by the obstacles around the vehicle is the lowest. Accordingly, all of the navigation functions listed on the display are accessible with a certain degree of limitation.

The loop like arrows at the right side of the screen indicate that the highlighted position circulates either upwardly or downwardly when the user continuously uses the scroll key or up/down keys in one of the directions. Thus, in the example of FIG. 17A, "Quick Points of Interest," "Quick Address Book (Top 5)," "Most Recent Destinations (Last 5)," "Immediate Turn List (Next 5)" and "Limited Setting" will be selected in sequence by moving the highlight upwardly or downwardly. The user may select the highlighted entry by pressing the enter key or giving a verbal instruction through the voice communication means.

Figure 17B:
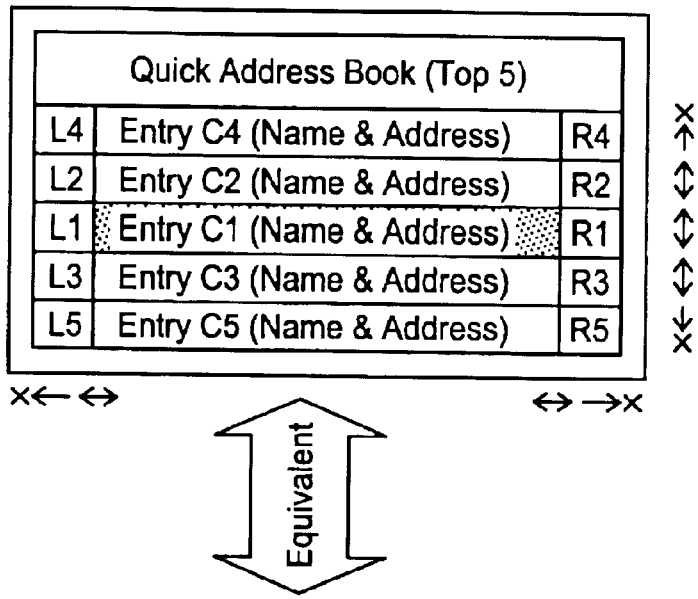

FIG. 17B shows an example of "Quick Address Book (Top 5)" screen when the surrounding drive condition of the vehicle is in the range 3. The display of FIG. 17B is activated through the "In-Motion Top Menu" of FIG. 17A. In the method of selecting the destination by "Quick Address Book", a user can select one of the addresses stored in an address book created by the user, thereby avoiding the trouble of inputting the address through the keyboard. In the example of FIGS. 17–19, the "Quick Address Book" lists addresses of user's preference in each of a center column, a left column and a right column.

As shown in FIG. 17B, preferably, the most frequently used address (entry C1) is placed at the center row in the center column, and the second and third frequently used addresses (entry C2, entry C3) are placed adjacent to the most frequently used address (entry C1). Likewise, fourth and fifth most frequently used addresses (entries C4 and C5) are placed adjacent to second and third most frequently used addresses.

Preferably, an initial highlighted position is on entry C1 because the possibility of selecting this entry is the highest. Entry C2 and entry C3 can be highlighted simply by moving the highlight once by pressing a key. Thus, entry C2 can be highlighted by one key operation and entry C3 can be highlighted by one key operation from the center. Likewise, entry 4 and entry 5 can be highlighted by two key operations from the center. This arrangement allows efficient operation by minimizing the number of key operations to select a desired entry. Since the most frequently used entries are placed in the center, this arrangement achieves a high probability of reaching the desired entry by a minimum number of key strokes.

Figure 17C:
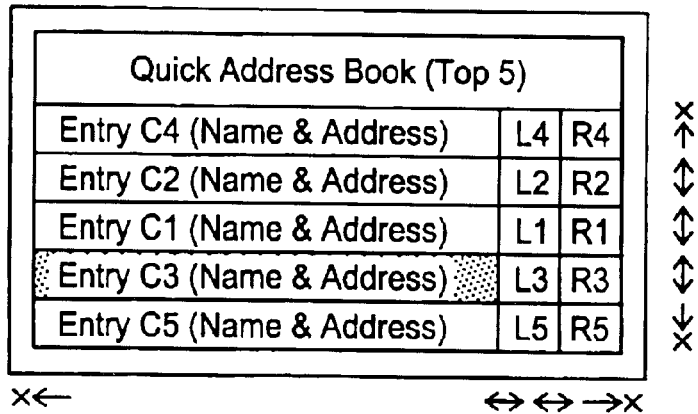
FIG. 17C shows the "Quick Address Book (Top 5)" screen where the items in the left column are displayed which is functionally equivalent to that of FIG. 17B.

As shown in FIG. 17B, in this example, the entries are arranges in five rows and three columns. The user may select entries in the left, center, or right column. As indicated by horizontal arrows at the bottom of FIG. 17B, the user may select entries in the left column or in the right column. FIG. 17B shows a list of addresses in the center column of the address book, and FIG. 17C shows a list of addresses in the left column of the address book. In either example of FIG. 17B or FIG. 17C, unlike the arrows in FIG. 17A, the highlight positions will not circulate as shown by the arrows on the right of the screen. However, it is also possible to arrange them so that the highlight circulates when the scroll key is continuously operated in one direction.

Figure 18A:
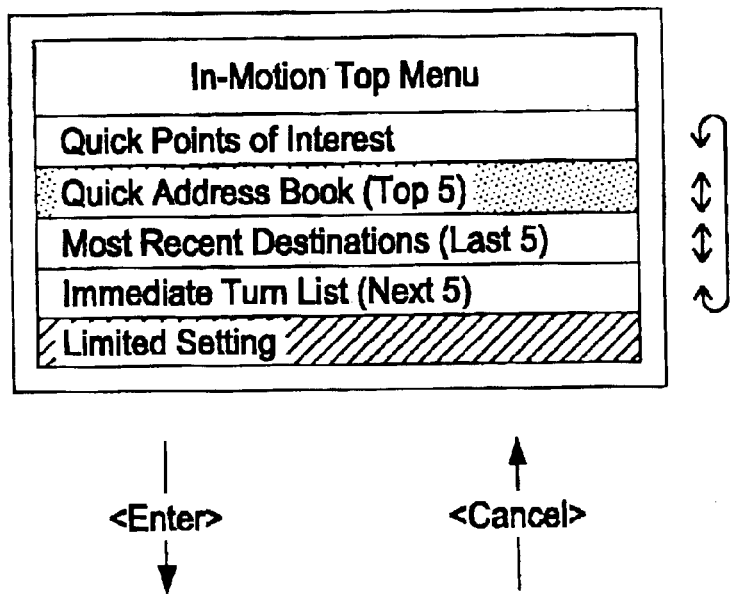
FIGS. 18A and 18B show display examples of "In-Motion Top Menu" screen and "Quick Address Book (Top 5)" screen, respectively, of the navigation system of the present invention where the degree of risk posed by the obstacles around the vehicle is the second lowest.

FIG. 18A shows an example of "In-Motion Top Menu" screen in the navigation system of the present invention when the vehicle is in motion and the driving condition and environment is in the range 2. The driving condition range 2 indicates that the degree of risk posed by the obstacles around the vehicle is the second lowest. Accordingly, some of the navigation functions may be accessible although not as much as in the range 3 shown in FIGS. 17A–17C.

In FIG. 18A, four menu items "Quick Points of Interest," "Quick Address Book (Top 5)," "Most Recent Destinations (Last 5)" and "Immediate Turn List (Next 5)" can be selected by highlighting and pressing the enter key. The highlighted positions can be changed in a circle manner by keep scrolling in either the upward or downward direction. In this example, a menu item "Limited Settings" is disabled. The user may select the highlighted entry by pressing the enter key or giving verbal instruction to the voice communication means.

Figure 18B:
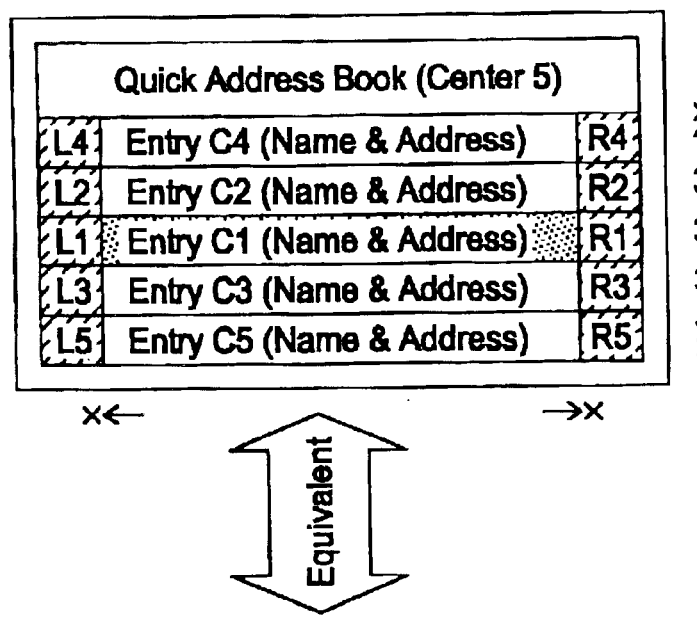

FIG. 18B shows an example of "Quick Address Book (Center 5)" screen which is activated through the display of FIG. 18A when the surrounding driving condition is in the range 2. As shown in FIG. 18B, the addresses (entries) in the address book are arranged in five rows and three columns. However, because of the surrounding driving condition, the entries in the left and right columns are disabled, prohibiting the user to access the entries in the left column or in the right column. Thus, in this example, the user is able to select one of five entries C1–C5 in the center column.

In this preferred embodiment, the most frequently used address (entry C1) is placed at the center, and the second and third frequently used addresses (entry C2, entry C3) are placed adjacent to the most frequently used address (entry C1). Likewise, fourth and fifth most frequently used addresses (entry C4, entry C5) are placed adjacent to second and third most frequently used addresses (entry C2, entry C3). An initial highlighted position is on entry C1 because the possibility of its being selected is the highest. Entry C2 and entry C3 can be selected by moving the highlighted position by one stroke. Likewise, entry 4 and entry 5 can be selected by changing the highlighted position by two strokes. This arrangement allows efficient operation by minimizing the number of key operations to select the desired entry. Since the most frequently used entries are positioned at the center, this arrangement achieves a high probability of reaching the desired entry by the minimum number of key strokes.

Figure 18C:
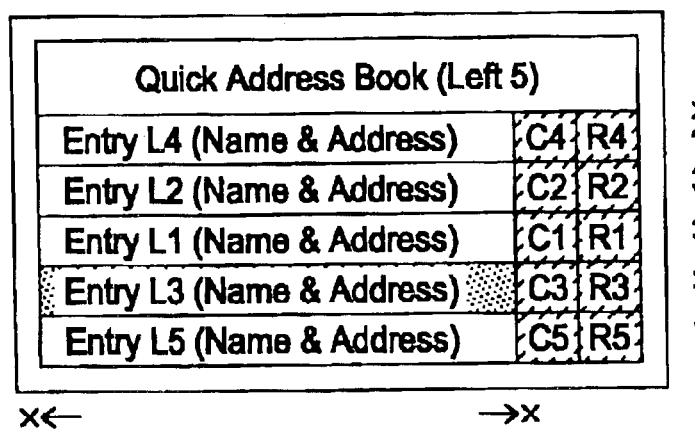
FIG. 18C shows the "Quick Address Book (Top 5)" screen where the items in the left column are displayed which is functionally equivalent to that of FIG. 18B.

FIG. 18C shows a list of addresses (entries) in the left column rather than the center column of FIG. 18B. Thus, display examples of FIG. 18B and FIG. 18C are equivalent to one another. In both FIG. 18B and FIG. 18C, the highlight positions are not circulated as shown by the arrows on the right side of the screen. Alternatively, it is also possible to arrange in such a way that the highlight position circulates similar to FIG. 18A. In FIG. 18B, the entries in the left column and the right column are disabled, and in FIG. 18C, the entries in the center column and the right column are disabled.

Figure 19A:
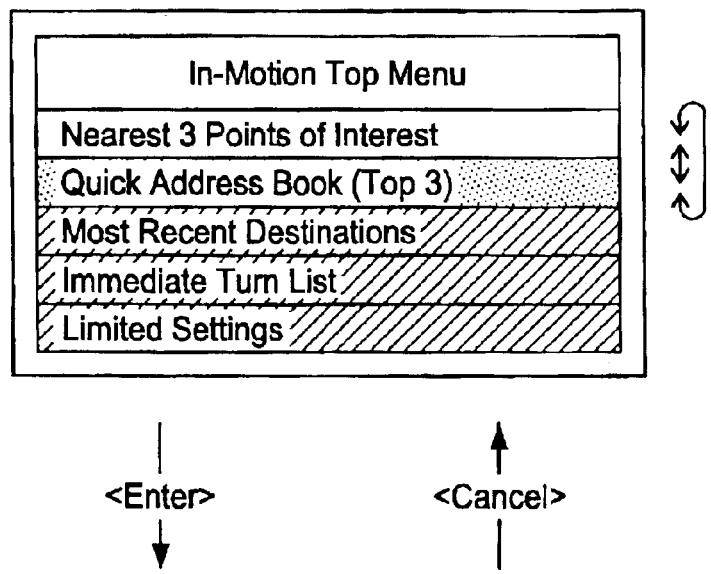
FIGS. 19A and 19B show display examples of "In-Motion Top Menu" screen and "Quick Address Book (Top 3)" screen, respectively, of the navigation system of the present invention where the degree of risk posed by the obstacles around the vehicle is the second highest.

FIG. 19A shows an example of "In-Motion Top Menu" screen in the navigation system of the present invention when the vehicle is in motion and the driving condition is in the range 1. The driving condition range 1 indicates that the degree of risk posed by the obstacles around the vehicle is the second highest. Accordingly, some of the navigation functions may be accessible although not as much as in the range 2 shown in FIGS. 18A–18B. In this example, three items "Most Recent Destinations" "Immediate Turn List" and "Limited Settings" are disabled. Thus, the user can select one of the two items "Nearest 3 Points of Interest" and "Quick Address Book" by changing the highlight through the loop like movement.

Figure 19B:
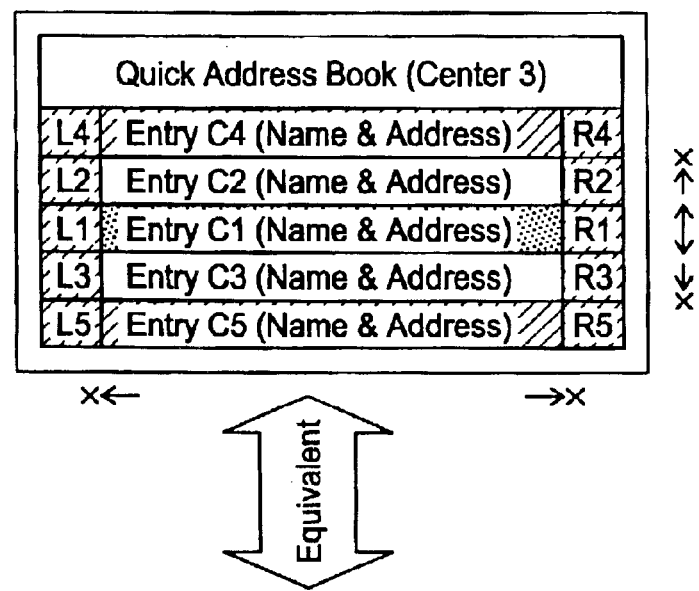

FIG. 19B shows an example of "Quick Address Book (Center 3)" screen which is activated through the display of FIG. 19A when the driving condition is in the range 1. As shown in FIG. 19B, the entries are arranged in five rows and three columns. In this example, the entries in the left column and the right columns as well as the entries in the top and bottom rows in the center column are disabled. Thus, the user can select one of only three entries (entries C1, C2 and C3) by moving the highlighted position.

In this preferred embodiment, as shown in FIG. 19B, the most frequently used address (entry C1) is placed at the center, and the second and third frequently used addresses (entry C2, entry C3) are placed adjacent to the most frequently used address (entry C1). An initial highlighted position is on entry C1 because the possibility of selecting this entry is the highest. Entry C2 and entry C3 can be selected by moving the highlight position by one step. This arrangement allows efficient operation by minimizing the number of key operations to select the desired entry.

Figure 19C:
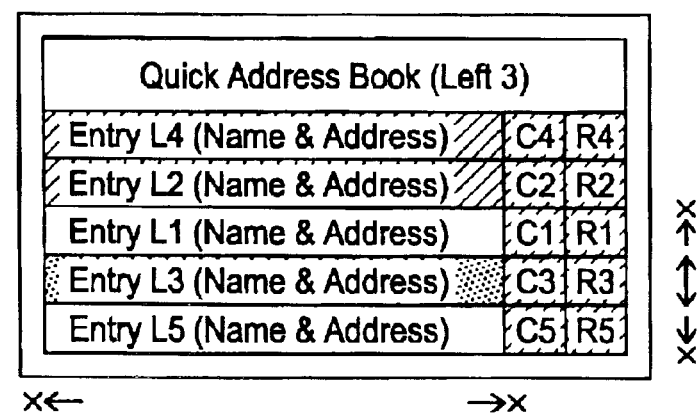
FIG. 19C shows the "Quick Address Book (Top 3)" screen where the items in the left column are displayed which is functionally equivalent to that of FIG. 19B.

FIG. 19C shows a list of addresses (entries) in the left column rather than the center column of FIG. 19B. Thus, display examples of FIG. 19B and FIG. 19C are equivalent to one another. In both FIG. 19B and FIG. 19C, the highlight positions are not circulate as shown by the arrows on the right side of the screen. Alternatively, it is also possible to arrange in such a way that the highlight position circulates similar to FIG. 19A. In FIG. 19C, the entries in the center column and the right column as well as two entries at the top (entries L4 and L2) are disabled. Thus, the user can select one of only three entries (entries L1, L2 and L3) by moving the highlighted position.

When the driving condition is in the range 0, the degree of risk posed by the obstacles around the vehicle is the highest. In this condition, "Collision hazard" warning is displayed and all of the access to the navigation functions are prohibited. Although not shown here, display example of such a "Collision hazard" warning similar to those shown in FIG. 13A, 13B or 13C will be displayed. Thus, the user cannot select any items or change any settings of the navigation system since such activities distracts the driver from the driving which is deemed dangerous in this particular driving condition.

As noted above, when the driving condition is changed, the navigation system detects the changes and dynamically controls the accessible range of the navigation functions. Thus, if the navigation screen shows the "In-Motion Top Menu" screen, the screen illustration will change among the ones shown in FIGS. 17A, 18A, 19A and the "Collision Hazard" warning display dynamically in response to the changes in the surrounding driving condition. Similarly, if the navigation screen shows the "Quick Address Book" screen, the screen illustration will dynamically change among the ones shown in FIGS. 17B, 18B, 19B and the "Collision Hazard" warning display in response to the changes in the driving conditions surrounding the vehicle.

FIGS. 20A, 20B and 20C show an example of operation of the navigation system of the present invention incorporating the concept of delayed screen update. The delayed screen update is used when the vehicle is in motion and thus the number of accessible items is limited on the navigation screen. For example, as shown in FIG. 20A, the navigation system allows the user to select one entries from three entries 1–3, i.e., the items in the areas with diagonal hatching are disabled. In such a situation, the delayed screen update of the present invention provides a small freedom to a user in selecting the range of items.

FIG. 20B schematically shows a situation where the highlight is moved to the bottom (entry 3) of the three selectable entries. The user's selection of the highlight position is promptly reflected on the display. However, the disabled areas remain unchanged for a certain period of time. Then, in FIG. 20C, after a predetermined delay time, the disabled area (with diagonal hatch) in the bottom changes to a new entry 4 which is selectable while the entry 1 is disabled. In other words, the three selectable entries shift downwardly by one step.

The predetermined delay time can be set by the user in a set-up procedure of the navigation system or automatically by the navigation system. An example of the predetermined delay time is five seconds, which means that it takes five second for the screen of FIG. 20B changes to the screen of FIG. 20C. Until the area of selectable entries shifts in response to the driver's selection, the user cannot select the entry.

Because of this delay, the user is discouraged from keep looking at the navigation screen, i.e, encouraged to concentrate on driving rather than operating the navigation functions. If the area of selectable entries shifts without delay, the user can continuously use the navigation functions to select a desired entry. Such configurations defeat the purpose of limiting the accessibility of the navigation functions. It is desirable to disrupt the operation of the navigation function so that the user will not continuously operate the navigation functions. Thus, the delayed screen update forces the driver to intermit the operation and to concentrate on the driving.

As has been described above, according to the present invention, the navigation method and system allows dynamic access to different degrees of navigation functions when the vehicle is in motion based on the conditions surrounding the vehicle such as distances from other vehicles and obstacles detected by sensors provided on the vehicle. When the degree of risk involved is high, the access to the navigation functions is further limited, and when the degree of risk is low, the scope of access to the navigation functions is increased. Thus, the user is able to select and set an entry quickly without being distracted from driving. Further, the navigation method and system of the present invention is designed to minimize the number of key operations which also reduces the time for selecting and setting the entry. Furthermore, the navigation method and system of the present invention is designed to discourage the user from continuously looking at the display screen by delaying the screen update, thereby avoiding distraction from the driving.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A navigation method of changing accessibility to functions of navigation system installed in a user vehicle, comprising the following steps of:

detecting whether the user vehicle is in motion or stationary;

detecting other vehicles or obstacles surrounding the user vehicle by a sensor provided on the user vehicle and measuring distances from the other vehicles or obstacles when the vehicle is in motion;

evaluating resultant data from the sensor and determining a range of driving conditions surrounding the user vehicle; and changing a degree of accessibility to navigation functions based on the range of the driving conditions and displaying entries on a monitor where a number of the entries that can be selected by a user is limited by the degree of accessibility;

wherein the number of said entries that can be displayed on the monitor of the navigation system when the vehicle is in motion is smaller than that can be displayed on the monitor when the vehicle is stationary.

2. A navigation method as defined in claim 1, wherein said step of changing the degree of accessibility to the navigation functions includes a step of displaying accessible entries on the monitor and disabling accessibility to other entries in response to the range of driving conditions.

3. A navigation method as defined in claim 1, wherein said step of changing the degree of accessibility to the navigation functions includes a step of displaying accessible entries on the monitor by allowing positioning of highlight on the accessible entries while disabling accessibility to other entries in response to the range of driving conditions by disabling positioning of the highlight on said other entries.

4. A navigation method as defined in claim 1, wherein said step of changing the degree of accessibility includes a step of changing display of accessible entries on the monitor every time when the degree of accessibility changes from a previous degree.

5. A navigation method as defined in claim 1, wherein said step of determining the range of driving conditions includes a step of producing two or more different ranges of driving conditions in response to results of evaluating the data from the sensor.

6. A navigation method as defined in claim 1, wherein said step of determining the range of driving conditions includes a step of producing two or more different ranges of driving conditions by evaluating the data from the sensor, and wherein said step of changing the degree of accessibility includes a step of prohibiting any access to the navigation functions when the range of driving conditions indicates that risk involved is highest.

7. A navigation method as defined in claim 1, wherein said step of changing the degree of accessibility includes a step of assigning an initial highlight position to an entry at a center of accessible entries on the monitor.

8. A navigation method as defined in claim 1, wherein said step of changing the degree of accessibility includes a step of changing a highlight position on the accessible entries in a closed loop manner so that the highlight position continuously moves in an upward or downward direction in response to user's key operations.

9. A navigation method as defined in claim 1, wherein said step of changing the degree of accessibility includes a step of assigning a most frequently used entry to a center of the monitor and entries next frequently used to near the center of the monitor and assigning an initial highlight on the entry at the center of the monitor, thereby minimizing a number of key operations for selecting an entry.

10. A navigation method as defined in claim 1, wherein said step of changing the degree of accessibility to the navigation functions includes a step of displaying accessible entries on the monitor and disabling accessibility to other entries in response to the range of driving conditions, and wherein said accessible entries are limited within a selected column when two or more columns of entries are provided for the monitor.

11. A navigation method as defined in claim 1, wherein said step of changing the degree of accessibility to the navigation functions includes a step of displaying an enabled area consisting of accessible entries and a disabled area consisting of non-accessible entries and shifting the enabled area a predetermined delay time after positioning a highlight on an end of the enabled area.

12. A navigation system installed in a user vehicle, comprising:
means for detecting whether the user vehicle is in motion or stationary;
means for detecting other vehicles or obstacles surrounding the user vehicle by a sensor provided on the user vehicle and measuring distances from the other vehicles or obstacles when the vehicle is in motion;
means for evaluating resultant data from the sensor and determining a range of driving conditions surrounding the user vehicle; and
means for changing a degree of accessibility to navigation functions based on the range of the driving conditions and displaying entries on a monitor of the navigation system where a number of the entries that can be selected by a user is limited by the degree of accessibility;
wherein the number of said entries that can be displayed on the monitor of the navigation system when the vehicle is in motion is smaller than that can be displayed on the monitor when the vehicle is stationary.

13. A navigation system as defined in claim 12, wherein said means for changing the degree of accessibility to the navigation functions includes means for displaying accessible entries on the monitor and disabling accessibility to other entries in response to the range of driving conditions.

14. A navigation system as defined in claim 12, wherein said means for changing the degree of accessibility to the navigation functions includes means for displaying accessible entries on the monitor by allowing positioning of highlight on the accessible entries while disabling accessibility to other entries in response to the range of driving conditions by disallowing positioning of the highlight on said other entries.

15. A navigation system as defined in claim 12, wherein said means for changing the degree of accessibility includes means for changing display of accessible entries on the monitor every time when the degree of accessibility changes from a previous degree.

16. A navigation system as defined in claim 12, wherein said means for determining the range of driving conditions includes means for producing two or more different ranges of driving conditions in response to results of evaluating the data from the sensor.

17. A navigation system as defined in claim 12, wherein said means for determining the range of driving conditions includes means for producing two or more different ranges of driving conditions by evaluating the data from the sensor, and wherein said means for changing the degree of accessibility includes means for prohibiting any access to the navigation functions when the range of driving conditions indicates that risk involved is highest.

18. A navigation system as defined in claim 12 wherein said means for changing the degree of accessibility includes means for assigning an initial highlight position to an entry at a center of accessible entries on the monitor.

19. A navigation system as defined in claim 12, wherein said means for changing the degree of accessibility includes means for changing a highlight position on the accessible entries in a closed loop manner so that the highlight position continuously moves in an upward or downward direction in response to user's key operations.

20. A navigation system as defined in claim 12, wherein said means for changing the degree of accessibility includes means for assigning a most frequently used entry to a center of the monitor and entries next frequently used to near the center of the monitor and assigning an initial highlight on the entry at the center of the monitor, thereby minimizing a number of key operations for selecting an entry.

21. A navigation system as defined in claim 12, wherein said means for changing the degree of accessibility to the navigation functions includes means for displaying accessible entries on the monitor and disabling accessibility to other entries in response to the range of driving conditions, and wherein said accessible entries are limited within a selected column when two or more columns of entries are provided for the monitor.

22. A navigation system as defined in claim 12, wherein said means for changing the degree of accessibility to the navigation functions includes means for displaying an enabled area consisting of accessible entries and a disabled area consisting of non-accessible entries and shifting the enabled area a predetermined delay time after positioning a highlight on an end of the enabled area.

* * * * *